United States Patent
Coustham et al.

(10) Patent No.: US 12,281,219 B2
(45) Date of Patent: Apr. 22, 2025

(54) POLYPROPYLENE COMPOSITIONS

(71) Applicant: TotalEnergies OneTech Belgium, Feluy (BE)

(72) Inventors: Thomas Coustham, Quarouble (FR); Aurélien Vantomme, Mignault (BE); Armelle Sigwald, Nivelles (BE); Alain Standaert, Brussels (BE)

(73) Assignee: TotalEnergies OneTech Belgium, Seneffe (BE)

( * ) Notice: Subject to any disclaimer, the term of this patent is extended or adjusted under 35 U.S.C. 154(b) by 699 days.

(21) Appl. No.: 17/603,049

(22) PCT Filed: Apr. 10, 2020

(86) PCT No.: PCT/EP2020/060301
§ 371 (c)(1),
(2) Date: Oct. 12, 2021

(87) PCT Pub. No.: WO2020/208218
PCT Pub. Date: Oct. 15, 2020

(65) Prior Publication Data
US 2022/0186009 A1    Jun. 16, 2022

(30) Foreign Application Priority Data
Apr. 12, 2019 (EP) .................... 19169076

(51) Int. Cl.
*C08L 23/14* (2006.01)
(52) U.S. Cl.
CPC ......... *C08L 23/142* (2013.01); *C08L 2205/02* (2013.01); *C08L 2314/06* (2013.01)
(58) Field of Classification Search
CPC ...... C08L 23/12; C08L 23/14; C08L 2205/02; C08L 2205/025; C08L 2314/06
See application file for complete search history.

(56) References Cited

U.S. PATENT DOCUMENTS

2007/0167576 A1\* 7/2007 Kim .................. C08L 23/10
525/240
2010/0105848 A1\* 4/2010 Meka .................. C08L 23/10
526/348
(Continued)

FOREIGN PATENT DOCUMENTS

EP         2535372 A1    12/2012
WO     2012072776 A1     6/2012
(Continued)

OTHER PUBLICATIONS

International Search Report issued in Application No. PCT/EP2020/060301, dated Jun. 23, 2020, 3 pages.
(Continued)

*Primary Examiner* — Robert C Boyle
(74) *Attorney, Agent, or Firm* — Amster, Rothstein & Ebenstein LLP

(57) ABSTRACT

The invention relates to a polypropylene composition comprising:
(A) a first polypropylene which is a metallocene-catalyzed homopolymer, or a metallocene-catalyzed random copolymer of propylene and of a co-monomer having at most 0.5% by weight of co-monomer content, relative to the total weight of the random copolymer, as determined by $^{13}C$ NMR analysis; and
(B) a second polypropylene which is a metallocene-catalyzed random copolymer of propylene and of a co-monomer;
wherein said polypropylene composition is as defined in claim 1.
The present invention also relates to a process for the preparation of said polypropylene composition. The present invention also relates to an article comprising said polypropylene composition.

14 Claims, 2 Drawing Sheets

(56) References Cited

U.S. PATENT DOCUMENTS

2014/0039124 A1    2/2014  Reichelt et al.
2014/0128549 A1*  5/2014  Kheirandish ........... C08L 23/10
                                                            525/240

FOREIGN PATENT DOCUMENTS

WO          2016116606 A1    7/2016
WO    WO-2017211723 A1 *  12/2017  ............ C08F 110/06

OTHER PUBLICATIONS

A. Ortin et al., "Characterization of Chemical Composition along the Molar Mass Distribution in Polyolefin Copolymers by GPC Using a Modern Filter-Based IR Detector"; Macromol. Symp., (2013), vol. 330, pp. 63-80.

T. Frijns-Bruls et al., "Studies on the Application of Filter-Based IR Detector for Polyolefin Characterization with HT-SEC"; Macromol. Symp., (2015), vol. 356, pp. 87-94.

A. Razavi et al. "The geometry of the site and its relevance for chain migration and stereospecificity"; Macromol. Symp., (1995) vol. 89, pp. 345-367.

H.N. Cheng, J. Ewen, "13C Nuclear magnetic resonance characterization of poly(propylene) prepared with homogeneous catalysts"; Makromol. Chem., (1989), vol. 190, pp. 1931-1940.

Plastics Additives Handbook, ed. H. Zweifel, 5th edition, 2001, Hanser Publishers.

* cited by examiner

POLYPROPYLENE COMPOSITIONS

CROSS-REFERENCE TO RELATED APPLICATIONS

This application claims the benefit of PCT/EP2020/060301 filed Apr. 10, 2020, which claims priority from EP 19169076.7 filed Apr. 12, 2019, which is incorporated herein by reference in its entirety for all purposes.

FIELD OF INVENTION

This invention relates to new polypropylene compositions and to articles comprising said polypropylene composition.

BACKGROUND OF THE INVENTION

Polypropylene offers a unique combination of mechanical and chemical properties. It has therefore found wide use in a large number of applications. It is generally of great importance to have a well processable material with good mechanical properties such as high flexural modulus and/or impact strength. A good flowability combined with adequate thermal properties are needed for achieving a good processability in various manufacturing methods of articles, thereby allowing a high production speed required for the mass production market.

The mechanical properties are also critical to avoid damage due to storing, handling or dropping of the articles made of polypropylene. Still further, the optical properties should be acceptable. Optical properties are mainly defined by the haze and the gloss of the material.

The haze is influenced by the nature and the crystallinity of the polypropylene, lowering the intrinsic crystallinity reduces the haze but also reduces the stiffness. Hence, the balance of stiffness and haze is of great importance.

Metallocene-based polypropylenes exhibit a range of interesting properties such as optical (haze and gloss) and organoleptic (few Volatile Organic Compound (VOC) and extractables) properties, and good rigidity/impact balance. However, the following drawbacks related to processing issues were noticed:

1) poor injection ability due to a narrow distribution obtained by the single-site mechanism of the metallocene catalyst, 2) low crystallization temperature that raises the cycle time in injection molding process.

Processing may be improved by several well-known methods: adding processing aids, ionizing or extruding with peroxides or controlled amount of oxygen. Aside from the added cost, numerous side effects are usually encountered, such as for example increase of gel content, worsening of mechanical properties, development of color and odors.

While the manufacturers of polypropylene have continuously worked to improve the properties of polypropylene used in the manufacture of various articles, the ever increasing requirements necessitate the further development of polypropylene.

There is thus still a need for resins that can be processed easily and offer simultaneously good mechanical properties.

SUMMARY OF THE INVENTION

It is therefore an object of the present invention to provide new polypropylene resins that have good mechanical properties and which can be easily processed.

In a first aspect, the present invention provides a polypropylene composition comprising:

(A) a first polypropylene which is a metallocene-catalyzed homopolymer or a metallocene-catalyzed random copolymer of propylene and of a co-monomer having at most 0.5% by weight of co-monomer content, relative to the total weight of the random copolymer, as determined by $^{13}C$ NMR analysis; and (B) a second polypropylene which is a metallocene-catalyzed random copolymer of propylene and of a co-monomer;

wherein said polypropylene composition has:
a total co-monomer content of at least 1.1% by weight relative to the total weight of said polypropylene composition, as determined by $^{13}C$ NMR analysis, said co-monomer being an alpha-olefin different from propylene;
a melting temperature $T_m$ of at least 140° C., measured by DSC;
a crystallization temperature $T_c$ of at least 95° C., measured by DSC;
a ratio of weight average molecular weight ($M_w$) to number average molecular weight ($M_n$) [$M_w/M_n$] of at least 3.5;
a ratio of z-average molecular weight ($M_z$) to weight average molecular weight ($M_w$) [$M_z/M_w$] of at least 2.2; and
a co-monomer distribution ratio $R(M_z)/R(M_n)$ of at most 0.995, wherein $R(M_z)$ is the ratio at $M_z$ of the IR signal measured at 2959 $cm^{-1}$ on the signal at 2928 $cm^{-1}$, and $R(M_n)$ is the ratio at $M_n$ of the IR signal measured at 2959 $cm^{-1}$ on the signal at 2928 $cm^{-1}$, as determined by IR-detected gel permeation chromatography.

In a second aspect, the present invention provides a process for the preparation of the polypropylene composition according to the first aspect of the invention comprising the steps of:

(i) providing a first polypropylene which is a metallocene-catalyzed homopolymer or a metallocene-catalyzed random copolymer of propylene and of a co-monomer having at most 0.5% by weight of co-monomer content, relative to the total weight of the random copolymer, as determined by $^{13}C$ NMR analysis;

(ii) providing a second polypropylene which is a metallocene-catalyzed random copolymer of propylene and of a co-monomer, (iii) and obtaining a polypropylene composition comprising said first and second polypropylene, wherein steps (i) and (ii) are carried out by polymerizing propylene and, if any, the co-monomer in the presence of a metallocene catalyst;

said polypropylene composition having:
a total co-monomer content of at least 1.1% by weight relative to the total weight of said polypropylene composition, as determined by $^{13}C$ NMR analysis, said co-monomer being an alpha-olefin different from propylene;
a melting temperature $T_m$ of at least 140° C., measured by DSC;
a crystallization temperature $T_c$ of at least 95° C., measured by DSC;
a ratio of weight average molecular weight ($M_w$) to number average molecular weight ($M_n$) [$M_w/M_n$] of at least 3.5;
a ratio of z-average molecular weight ($M_z$) to weight average molecular weight ($M_w$) [$M_z/M_w$] of at least 2.2; and a co-monomer distribution ratio $R(M_z)/R(M_n)$ of at most 0.995, wherein $R(M_z)$ is the ratio at $M_z$ of the IR signal measured at 2959 cm$^{-1}$ on the signal at 2928 cm$^{-1}$, and $R(M_n)$ is the ratio at $M_n$ of the IR signal measured at 2959 cm$^{-1}$ on the signal at 2928 cm$^{-1}$, as determined by IR-detected gel permeation chromatography.

In a third aspect, the present invention encompasses an article comprising a polypropylene composition according to the first aspect of the invention.

The invention overcomes the drawbacks of the aforementioned strategies. The present invention provides polypropylene resins having broad molecular weight distributions, ideal co-monomer incorporation and improved processing and mechanical properties. The present polypropylene composition is a bimodal polypropylene combining co-monomer content and molecular weight bimodality. The present invention with the combination of the two bimodalities, (bimodality in co-monomer content and a bimodality in molecular weight distribution), allows an improvement of mechanical properties with better impact/stiffness balance (improved stiffness without losing impact properties), a significant improvement of injectability (spiral flow: the longer the spiral flow the better the ability to inject). The difference of co-monomer concentration in the two distributions provides the advantage of increasing the crystallization temperature of the final composition and thereby decrease the cycle time for injection process.

After the polypropylene composition is produced, it may be formed into various articles, including but not limited to, injection moulding, blow moulding, injection stretch blow moulding (ISBM), cast or blown film extrusion, sheet extrusion, etc.

The independent and dependent claims set out particular and preferred features of the invention. Features from the dependent claims may be combined with features of the independent or other dependent claims as appropriate.

The present invention will now be further described. In the following passages, different aspects of the invention are defined in more detail. Each aspect so defined may be combined with any other aspect or aspects unless clearly indicated to the contrary. In particular, any feature or statement indicated as being preferred or advantageous may be combined with any other features or statements indicated as being preferred or advantageous.

DETAILED DESCRIPTION OF THE INVENTION

Figure 1:
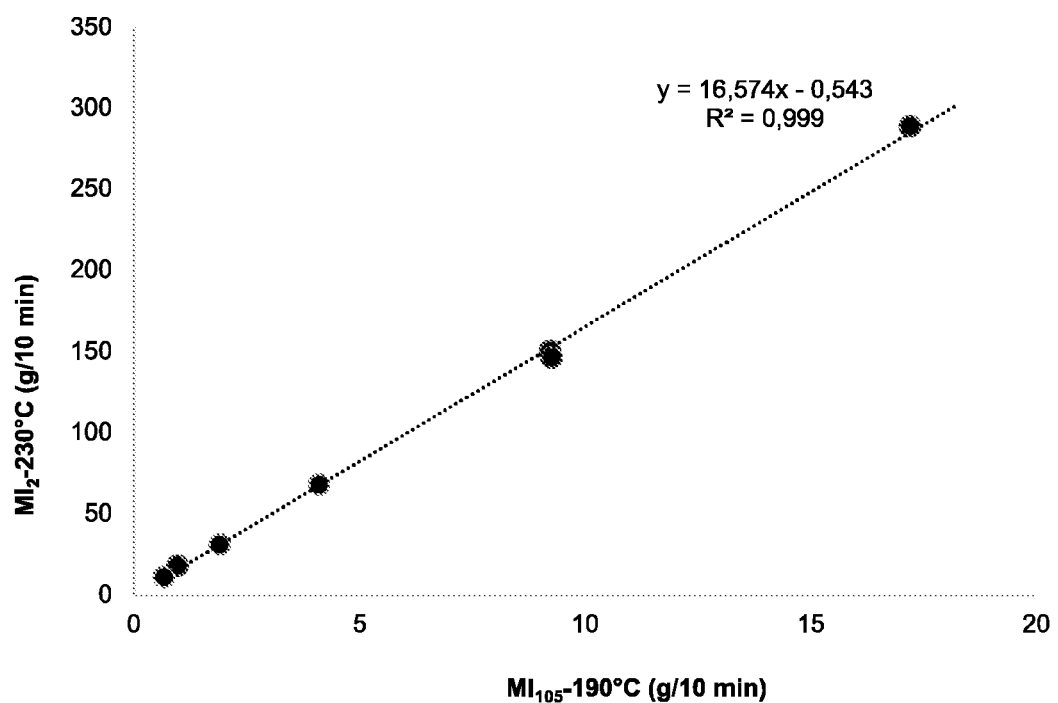
FIG. 1 represents a graph plotting the melt flow index $MI_{10.5}$ as a function of melt flow index $MI_2$ measured for polypropylene resins.

Before the present compositions, processes, articles, and uses encompassed by the invention are described, it is to be understood that this invention is not limited to particular compositions, processes, articles, and uses described, as such compositions, processes, articles, and uses may, of course, vary. It is also to be understood that the terminology used herein is not intended to be limiting, since the scope of the present invention will be limited only by the appended claims.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. When describing the compounds, processes, articles, and uses of the invention, the terms used are to be construed in accordance with the following definitions, unless the context dictates otherwise.

As used herein, the singular forms "a", "an", and "the" include both singular and plural referents unless the context clearly dictates otherwise. By way of example, "a resin" means one resin or more than one resin.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims and statements, any of the embodiments can be used in any combination.

Preferred statements (features) and embodiments of the resins, processes, polymers, articles, and uses of this invention are set herein below. Each statement and embodiment of the invention so defined may be combined with any other statement and/or embodiment, unless clearly indicated to the contrary. In particular, any feature indicated as being preferred or advantageous may be combined with any other features or statements indicated as being preferred or advantageous. Hereto, the present invention is in particular captured by any one or any combination of one or more of the below numbered statements and embodiments, with any other aspect and/or embodiment.

1. A polypropylene composition comprising:
   (A) a first polypropylene which is a metallocene-catalyzed homopolymer or a metallocene-catalyzed random copolymer of propylene and of a co-monomer having at most 0.5% by weight of co-monomer content, relative to the total weight of the random copolymer, as determined by $^{13}$C NMR analysis; and
   (B) a second polypropylene which is a metallocene-catalyzed random copolymer of propylene and of a co-monomer;
   wherein said polypropylene composition has:
      a total co-monomer content of at least 1.1% by weight relative to the total weight of said polypropylene composition, as determined by $^{13}$C NMR analysis, said co-monomer being an alpha-olefin different from propylene, preferably said alpha-olefin is ethylene;
      a melting temperature $T_m$ of at least 140° C., measured by DSC, preferably by DSC at cooling and heating rates of 20° C./min;
      a crystallization temperature $T_c$ of at least 95° C., measured by DSC; preferably of at least 100° C., preferably by DSC at cooling and heating rates of 20° C./min;
      a ratio of weight average molecular weight ($M_w$) to number average molecular weight ($M_n$) [$M_w/M_n$] of at least 3.5;
      a ratio of z-average molecular weight ($M_z$) to weight average molecular weight ($M_w$) [$M_z/M_w$] of at least 2.2; and
      a co-monomer distribution ratio $R(M_z)/R(M_n)$ of at most 0.995, wherein $R(M_z)$ is the ratio at $M_z$ of the IR signal measured at 2959 cm$^{-1}$ on the signal at 2928 cm$^{-1}$, and $R(M_n)$ is the ratio at $M_n$ of the IR signal measured at 2959 cm$^{-1}$ on the signal at 2928 cm$^{-1}$, as determined by IR-detected gel permeation chromatography.

2. The polypropylene composition according to statement 1, wherein composition comprises a physical blend of said first polypropylene and second polypropylene.

3. The polypropylene composition according to any one of statements 1-2, further comprising at least one nucleating agent.

4. The polypropylene composition according to any one of statements 1-3, having a ratio of z-average molecular weight ($M_z$) to number average molecular weight ($M_n$) [$M_z/M_n$] of at least 6.0, preferably at least 8.0, preferably at least 10.0, preferably at least 12.0.

5. The polypropylene composition according to any one of statements 1-4, having a $M_w/M_n$ of at least 3.6, preferably at least 4.0, preferably at least 4.5, preferably at most 12.0, for example at most 10.0, for example $M_w/M_n$ can be ranging from 3.5 to 12.0, preferably from 4.0 to 12.0, preferably from 4.3 to 12.0, preferably from 4.5 to 12.0, preferably from 4.5 to 10.0, preferably from 4.5 to 9.5.

6. The polypropylene composition according to any one of statements 1-5, having a $M_z/M_w$ of at least 2.2, preferably at least 2.3, preferably at least 2.4, preferably at least 2.5, preferably at least 2.6.

7. The polypropylene composition according to any one of statements 1-6, wherein the melt flow index of the first polypropylene is greater than the melt flow index of the second polypropylene; the values of melt flow index being measured according to ISO 1133:2005, Method B, condition M, at a temperature 230° C. and a 2.16 kg load.

8. The polypropylene composition according to any one of statements 1-7, wherein the melt flow index of the first polypropylene, preferably of the polypropylene homopolymer is at least 30.0 g/10 min, preferably at least 50.0 g/10 min, preferably at least 60.0 g/10 min, preferably at least 75.0 g/10 min, preferably at least 100.0, preferably at least 150.0 g/10 min; wherein melt flow indexes lower than 300.0 g/10 min are measured according to ISO 1133:2005 Method B, condition M, at a temperature 230° C. and a 2.16 kg load, and melt flow indexes greater than 300.0 g/10 min, are measured at a temperature 190° C. and a 2.16 kg load using a die of 1 mm.

9. The polypropylene composition according to any one of statements 1-8, wherein the melt flow index of the second polypropylene which is a polypropylene random copolymer is of at most 30.0 g/10 min, preferably at most 25.0 g/10 min, for example at most 20.0 g/10 min, for example at most 15.0 g/10 min, for example at most 10.0 g/10 min, for example at most 5.0 g/10 min as measured according to ISO 1133:2005 Method B, condition M, at a temperature 230° C. and a 2.16 kg load.

10. The polypropylene composition according to any one of statements 1-9, wherein the melt flow index of the second polypropylene which is a polypropylene random copolymer is preferably at least 0.01 g/10 min, preferably at least 0.05 g/10 min, preferably at least 0.1 g/10 min, preferably at least 0.3 g/10 min; as measured according to ISO 1133:2005 Method B, condition M, at a temperature 230° C. and a 2.16 kg load.

11. The polypropylene composition according to any one of statements 1-10, wherein said co-monomer is ethylene.

12. The polypropylene composition according to any one of statements 1-11, having a melt flow index ranging of at least 1.0 g/10 min, preferably at least 3.0 g/10 min, preferably at least 4.0 g/10 min, preferably at least 5.0 g/10 min, preferably at least 6.0 g/10 min, preferably at least 8.0 g/10 min; as measured according to ISO 1133:2005 Method B, condition M, at a temperature 230° C. and a 2.16 kg load.

13. The polypropylene composition according to any one of statements 1-12, having a melt flow index of at most 200 g/10 min, preferably at most 150 g/10 min, preferably at most 110 g/10 min, preferably at most 100 g/10 min, preferably at most 80.0 g/10 min, preferably at most 60.0 g/10 min, preferably at most 50.0 g/10 min, preferably at most 45.0 g/10 min, preferably at most 35.0 g/10 min; as measured according to ISO 1133:2005 Method B, condition M, at a temperature 230° C. and a 2.16 kg load.

14. The polypropylene composition according to any one of statements 1-13, having a melt flow index ranging from 1.0 to 200 g/10 min, preferably from 5.0 to 110 g/10 min, more preferably from 5.0 to 50.0 g/10 min, more preferably from 8.0 to 35.0 g/10 min; as measured according to ISO 1133:2005 Method B, condition M, at a temperature 230° C. and a 2.16 kg load.

15. The polypropylene composition according to any one of statements 1-14, having a total co-monomer content ranging from 1.1% to 8.0% by weight, preferably from 1.1% to 6.0% by weight, preferably from 1.1% to 3.0% by weight, relative to the total weight of said polypropylene composition as determined by $^{13}$C NMR analysis.

16. The polypropylene composition according to any one of statements 1-15, wherein the total co-monomer content of the second polypropylene i.e. of the metallocene-catalyzed random copolymer is ranging from 1.0% to 8.0% by weight as determined by $^{13}$C NMR analysis, preferably from 1.0% to 6.0% by weight, preferably from 1.0% to 5.0% by weight, relative to the total weight of said polypropylene composition.

17. The polypropylene composition according to any one of statements 1-16, comprising: from 20 to 80% by weight of the first polypropylene, preferably from 30 to 70% by weight, preferably from 40 to 60% by weight, preferably from 45 to 60% by weight relative to the total weight of the composition.

18. The polypropylene composition according to any one of statements 1-17, comprising: from 20 to 80% by weight of the second polypropylene, preferably from 30 to 70% by weight, preferably from 35 to 60% by weight, preferably from 40 to 55% by weight relative to the total weight of the composition.

19. The polypropylene composition according to any one of statements 1-18, comprising: from 80 to 20% by weight of the first polypropylene, preferably from 70 to 30% by weight, preferably from 60 to 40% by weight, preferably from 60 to 45% by weight relative to the total weight of the composition, and from 20 to 80% by weight of the second polypropylene, preferably from 30 to 70% by weight, preferably from 35 to 60% by weight, preferably from 40 to 55% by weight relative to the total weight of the composition.

20. The polypropylene composition according to any one of statements 1-19, having a flexural modulus greater than 1000 MPa, the flexural modulus being measured at 23° C. according to ISO 178:2011 method A.

21. The polypropylene composition according to any one of statements 1-20, having notched Izod impact strength of at least 2.8 as measured according to ISO 180/A: 2000 at 23° C.

22. A process for the preparation of the polypropylene composition according to any one of statements 1-21 comprising the steps of:
    (i) providing a first polypropylene which is a metallocene-catalyzed homopolymer or a metallocene-catalyzed random copolymer of propylene and of a co-monomer, having at most 0.5% by weight of co-monomer content, relative to the total weight of the random copolymer, as determined by $^{13}$C NMR analysis; and
    (ii) providing a second polypropylene which is a metallocene-catalyzed random copolymer of propylene and of a co-monomer,
    (iii) and obtaining a polypropylene composition comprising said first and second polypropylene, wherein steps (i) and (ii) are carried out by polymerizing propylene and, if any, the co-monomer in the presence of a metallocene catalyst;
    said polypropylene composition having:
        a total co-monomer content of at least 1.1% by weight relative to the total weight of said polypropylene composition, as determined by $^{13}$C NMR analysis, said co-monomer being an alpha-olefin different from propylene, preferably said alpha-olefin being ethylene;
        a melting temperature $T_m$ of at least 140° C., measured by DSC, preferably at cooling and heating rates of 20° C./min;
        a crystallization temperature $T_c$ of at least 95° C., measured by DSC, preferably at cooling and heating rates of 20° C./min;
        a ratio of weight average molecular weight ($M_w$) to number average molecular weight ($M_n$) [$M_w/M_n$] of at least 3.5;
        a ratio of z-average molecular weight ($M_z$) to weight average molecular weight ($M_w$) [$M_z/M_w$] of at least 2.2; and
        a co-monomer distribution ratio $R(M_z)/R(M_n)$ of at most 0.995, wherein $R(M_z)$ is the ratio at $M_z$ of the IR signal measured at 2959 cm$^{-1}$ on the signal at 2928 cm$^{-1}$, and $R(M_n)$ is the ratio at $M_n$ of the IR signal measured at 2959 cm$^{-1}$ on the signal at 2928 cm$^{-1}$, as determined by IR-detected gel permeation chromatography.

23. The process according to statement 22, wherein step (iii) is carried out by blending said first polypropylene and said second polypropylene or by mixing said first polypropylene to the second polypropylene simultaneously to the preparation thereof.

24. The process according to any one of statements 22-23, wherein said polypropylene composition of step (iii) is obtained by physical blending of said first and second polypropylene, in some embodiments, said physical blending can comprise the blending of polypropylene fluff or pellets of said first and second polypropylene, or the blending of solutions of said first and second polypropylene.

25. The process according to any one of statements 22-23, wherein said polypropylene composition of step (iii) is obtained by chemical blending of said first and second polypropylene, preferably by mixing said first polypropylene to the second polypropylene simultaneously to the preparation thereof.

26. A polypropylene composition according to any one of statements 1-21 obtained by the process according to any one of statements 22-25.

27. An article comprising a polypropylene composition according to any one of statements 1-21, 26.

28. Use of a polypropylene composition according to any one of statements 1-21, 26 for the production of films or injection or blow moulded articles.

The present invention relates to a polypropylene composition comprising: (A) a first polypropylene which is a metallocene-catalyzed homopolymer or a metallocene-catalyzed random copolymer of propylene and of a co-monomer having at most 0.5% by weight of co-monomer content, relative to the total weight of the random copolymer, as determined by $^{13}$C NMR analysis; and (B) a second polypropylene which is a metallocene-catalyzed random copolymer of propylene and of a co-monomer.

Preferably, the present invention relates to a polypropylene composition comprising a physical blend of: (A) a first polypropylene which is a metallocene-catalyzed homopolymer or a metallocene-catalyzed random copolymer of propylene and of a co-monomer having at most 0.5% by weight of co-monomer content, relative to the total weight of the random copolymer, as determined by $^{13}$C NMR analysis; and (B) a second polypropylene which is a metallocene-catalyzed random copolymer of propylene and of a co-monomer.

The first polypropylene is preferably a homopolymer of propylene. As used herein, the term homopolymer refers to a polymer that has less than 0.1% by weight, preferably less than 0.05% by weight, more preferably less than 0.01% by weight and most preferably less than 0.005% by weight, as determined by $^{13}$C NMR analysis, of alpha-olefins other than propylene in the polymer relative to the total weight of the homopolymer. Most preferred, no other alpha-olefins are detectable. Preferably, the first polypropylene is a homopolymer of propylene having a co-monomer content of less than 0.1% by weight, more preferably less than 0.05% by weight, even more preferably less than 0.01% by weight and most preferably less than 0.005% by weight relative to the total weight of the propylene homopolymer, as determined by $^{13}$C NMR analysis.

The first polypropylene can also be a metallocene-catalyzed random copolymer of propylene and of a co-monomer having at most 0.5% by weight of co-monomer content, as determined by $^{13}$C NMR analysis.

Preferably, the melt flow index $MI_2$ of the first polypropylene, preferably of the polypropylene homopolymer, is greater than 30.0 g/10 min, preferably greater than 50.0 g/10 min, preferably greater than 80.0 g/10 min, preferably greater than 100.0 g/10 min, preferably greater than 150.0 g/10 min, preferably greater than 200.0 g/10 min. Melt flow indexes lower than 300.0 g/10 min are preferably measured according to ISO 1133:2005 Method B, condition M, at a temperature 230° C. and a 2.16 kg load, and melt flow indexes greater than 300.0 g/10 min, are preferably measured at a temperature 190° C. and a 2.16 kg load using a die of 1 mm.

Preferably, the polypropylene homopolymer is characterized by a high isotacticity, for which the content of mmmm pentads is a measure. Preferably the content of mmmm pentads is at least 85.0%, preferably at least 88.0%, preferably at least 90.0%, more preferably at least 95.0%, even more preferably at least 97.0% and most preferably of at least 98.0%. The isotacticity may be determined by $^{13}$C-NMR analysis as described in the test methods part.

The second polypropylene is a metallocene-catalyzed random copolymer of propylene and of a co-monomer.

The term "random" indicates that the co-monomers of the propylene copolymer are randomly distributed within the propylene copolymer. The term random is understood according to IUPAC (Glossary of basic terms in polymer science; IUPAC recommendations 1996).

The co-monomer is an alpha-olefin different from propylene. Preferably, the co-monomer is selected from the group consisting of ethylene, 1-butene, 1-pentene, 1-hexene and 4-methyl-1-pentene. More preferably, the co-monomer is selected from the group consisting of ethylene, 1-butene and 1-hexene. Even more preferably, the co-monomer is ethylene. Preferably, the second polypropylene is a metallocene-catalyzed random copolymer of propylene and ethylene as co-monomer.

Preferably, the melt flow index of the polypropylene random copolymer is of at most 30.0 g/10 min, preferably at most 20.0 g/10 min, for example at most 10.0 g/10 min, for example at most 5.0 g/10 min, for example at most 2.5 g/10 min, for example at most 2.0 g/10 min, preferably from 0.05 to at most 30.0 g/10 min, preferably from 0.05 to 20.0 g/10 min, preferably from 0.05 to 5.0 g/10 min, preferably from 0.05 to 2.5 g/10 min; as measured according to ISO 1133: 2005 Method B, condition M, at a temperature 230° C. and a 2.16 kg load.

Preferably, the total co-monomer content of the second polypropylene i.e. the polypropylene metallocene-catalyzed random copolymer is at least 1.0% by weight as determined by $^{13}$C NMR analysis, preferably at least 1.5% by weight, preferably at least 2.0% by weight, preferably at least 2.5% by weight, relative to the total weight of said polypropylene composition. Preferably, the total co-monomer content of the metallocene-catalyzed random copolymer is at most 8.0% by weight, preferably at most 7.0% by weight, preferably at most 6.0% by weight, preferably at most 5.5% by weight. Preferably, the total co-monomer content of the second polypropylene i.e. of the metallocene-catalyzed random copolymer is ranging from 1.5% to 8.0% by weight, preferably from 2.0% to 6.0% by weight, preferably from 2.5% to 5.0% by weight, relative to the total weight of said polypropylene composition.

According to the invention, the polypropylene composition has:
- a total co-monomer content of at least 1.1% by weight relative to the total weight of said polypropylene composition, as determined by $^{13}$C NMR analysis as described in detail in the examples, said co-monomer being an alpha-olefin different from propylene;
- a melting temperature $T_m$ of at least 140° C., measured by DSC at cooing and heating rates of 20° C./min;
- a crystallization temperature $T_c$ of at least 95° C., measured by DSC at cooling and heating rates of 20° C./min;
- a ratio of weight average molecular weight ($M_w$) to number average molecular weight ($M_n$) [$M_w/M_n$] of at least 3.5;
- a ratio of z-average molecular weight ($M_z$) to weight average molecular weight ($M_w$) [$M_z/M_w$] of at least 2.2; and
- a co-monomer distribution ratio $R(M_z)/R(M_n)$ of at most 0.995, wherein $R(M_z)$ is the ratio at $M_z$ of the IR signal measured at 2959 cm$^{-1}$ on the signal at 2928 cm$^{-1}$, and $R(M_n)$ is the ratio at $M_n$ of the IR signal measured at 2959 cm$^{-1}$ on the signal at 2928 cm$^{-1}$, as determined by IR-detected gel permeation chromatography.

The co-monomer is an alpha-olefin different from propylene. Preferably, the co-monomer is selected from the group consisting of ethylene, 1-butene, 1-pentene, 1-hexene and 4-methyl-1-pentene. More preferably, the co-monomer is selected from the group consisting of ethylene, 1-butene and 1-hexene. Even more preferably, the co-monomer is ethylene.

Preferably, the present invention provides a polypropylene composition comprising:

(A) a first polypropylene which is a metallocene-catalyzed homopolymer, or a metallocene-catalyzed random copolymer of propylene with ethylene as comonomer, having at most 0.5% by weight of ethylene content, relative to the total weight of the random copolymer, as determined by $^{13}$C NMR analysis; and (B) a second polypropylene which is a metallocene-catalyzed random copolymer of propylene with ethylene as comonomer;

wherein said polypropylene composition has:
- a total ethylene content of at least 1.1% by weight relative to the total weight of said polypropylene composition, as determined by $^{13}$C NMR analysis;
- a melting temperature $T_m$ of at least 140° C., measured by DSC at cooing and heating rates of 20° C./min;
- a crystallization temperature $T_c$ of at least 95° C., measured by DSC at cooling and heating rates of 20° C./min;
- a ratio of weight average molecular weight ($M_w$) to number average molecular weight ($M_n$) [$M_w/M_n$] of at least 3.5;
- a ratio of z-average molecular weight ($M_z$) to weight average molecular weight ($M_w$) [$M_z/M_w$] of at least 2.2; and
- an ethylene distribution ratio $R(M_z)/R(M_n)$ of at most 0.995, wherein $R(M_z)$ is the ratio at $M_z$ of the IR signal measured at 2959 cm$^{-1}$ on the signal at 2928 cm$^{-1}$, and $R(M_n)$ is the ratio at $M_n$ of the IR signal measured at 2959 cm$^{-1}$ on the signal at 2928 cm$^{-1}$, as determined by IR-detected gel permeation chromatography.

More preferably, the present invention provides a polypropylene composition comprising a physical blend of:

(A) a first polypropylene which is a metallocene-catalyzed homopolymer, or a metallocene-catalyzed random copolymer of propylene with ethylene as comonomer, having at most 0.5% by weight of ethylene content, relative to the total weight of the random copolymer, as determined by $^{13}$C NMR analysis; and (B) a second polypropylene which is a metallocene-catalyzed random copolymer of propylene with ethylene as comonomer;

wherein said polypropylene composition has:
a total ethylene content of at least 1.1% by weight relative to the total weight of said polypropylene composition, as determined by $^{13}$C NMR analysis;
a melting temperature $T_m$ of at least 140° C., measured by DSC at cooing and heating rates of 20° C./min;
a crystallization temperature $T_c$ of at least 95° C., measured by DSC at cooling and heating rates of 20° C./min;
a ratio of weight average molecular weight ($M_w$) to number average molecular weight ($M_n$) [$M_w/M_n$] of at least 3.5;
a ratio of z-average molecular weight ($M_z$) to weight average molecular weight ($M_w$) [$M_z/M_w$] of at least 2.2; and
an ethylene distribution ratio $R(M_z)/R(M_n)$ of at most 0.995, wherein $R(M_z)$ is the ratio at $M_z$ of the IR signal measured at 2959 cm$^{-1}$ on the signal at 2928 cm$^{-1}$, and $R(M_n)$ is the ratio at $M_n$ of the IR signal measured at 2959 cm$^{-1}$ on the signal at 2928 cm$^{-1}$, as determined by IR-detected gel permeation chromatography.

Hence, in a preferred embodiment, the polypropylene composition according to the present invention is a polypropylene composition having bimodal ethylene distribution.

Preferably, said polypropylene composition according to the present invention may have a melting temperature ranging from 140° C. and 170° C., said melting temperature being measured by DSC at cooling and heating rates of 20° C./min.

Preferably, the difference between the melting temperature $T_m$ and the crystallization temperature $T_c$ of the non-nucleated polypropylene composition ($T_m$-$T_c$) is greater than 33.0° C., preferably greater than 34.0° C., preferably greater than 35.0° C., preferably greater than 36.0° C.

Preferably, said polypropylene composition may have a ratio of z-average molecular weight ($M_z$) to number average molecular weight ($M_n$) [$M_z/M_n$] of at least 6.0, preferably at least 7.0, preferably at least 8.0, preferably at least 9.0, preferably at least 10.0, preferably at least 11.0, preferably at least 12.0.

Preferably, said polypropylene composition may have a molecular weight distribution, defined as $M_w/M_n$, of at least 3.7, preferably at least 4.0, preferably at least 4.5, preferably at most 12.0, for example at most 10.0, for example $M_w/M_n$ can be ranging from 3.6 to 11.0, preferably from 4.0 to 10.0, preferably from 4.3 to 10.0, preferably from 4.5 to 10.0, preferably from 4.5 to 10.0, preferably from 4.5 to 9.5. Molecular weights can be determined by size exclusion chromatography (SEC), frequently also referred to as gel permeation chromatography (GPC), as described in detail in the example section.

Preferably, said polypropylene composition may have a $M_z/M_w$, of at least 2.3, preferably at least 2.4, preferably at least 2.5, preferably at least 2.6.

Preferably, said polypropylene composition may have a melt flow index ranging from 1.0 to 200 g/10 min, preferably from 1.0 to 100 g/10 min, preferably from 5.0 to 100 g/10 min, preferably from 1.0 to 50 g/10 min, preferably from 5.0 to 50.0 g/10 min, preferably from 5.0 to 40.0 g/10 min, preferably from 8.0 to 35.0 g/10 min, preferably 8.0 to 30.0 g/10 min; as measured according to ISO 1133:2005 Method B, condition M, at a temperature 230° C. and a 2.16 kg load.

As mentioned above, the polypropylene composition has a total co-monomer content of at least 1.1% by weight relative to the total weight of said polypropylene composition. Preferably, the total co-monomer content is at least 1.2% by weight, even more preferably at least 1.5% by weight. Preferably, the co-monomer content is at most 6.0% by weight, more preferably at most 5.0% by weight, even more preferably 4.0% by weight, most preferably at most 3.0% by weight, most preferably at most 2.5% by weight. The co-monomer content of the polypropylene composition can be determined by $^{13}$C NMR analysis as described in detail in the examples.

Preferably the co-monomer is ethylene, and the polypropylene composition has a total ethylene content of at least 1.1% by weight relative to the total weight of said polypropylene composition. Preferably, the total ethylene content is at least 1.2% by weight, even more preferably at least 1.5% by weight. Preferably, the ethylene content is at most 6.0% by weight, more preferably at most 5.0% by weight, even more preferably 4.0% by weight, most preferably at most 3.0% by weight, most preferably at most 2.5% by weight. The ethylene content of the polypropylene composition can be determined by $^{13}$C NMR analysis as described in detail in the examples.

Preferably, within said polypropylene composition according to the present invention said first polypropylene represents from 20 to 80% by weight, relative to the weight of said first and second polypropylene, preferably from 30 to 70% by weight, preferably from 40 to 60% by weight, preferably from 45 to 60% by weight relative to the weight of said first and second polypropylene. Within said polypropylene composition according to the present invention said second polypropylene random copolymer represents from 20 to 80% by weight, preferably from 30 to 70% by weight, preferably from 35 to 60% by weight, preferably from 40 to 55% by weight relative to the weight of said first and second polypropylene.

Preferably, the polypropylene composition comprises from 80 to 20% by weight of the first polypropylene, preferably from 70 to 30% by weight, preferably from 60 to 40% by weight, preferably from 60 to 45% by weight relative to the total weight of said first and second polypropylene, and from 20 to 80% by weight of the second polypropylene, preferably from 30 to 70% by weight, preferably from 35 to 60% by weight, preferably from 40 to 55% by weight relative to the total weight of said first and second polypropylene.

Preferably, the polypropylene composition comprises at least 70% by weight of said first and second polypropylene relative to the total weight of said polypropylene composition, preferably at least 80% by weight, preferably at least 85% by weight, preferably at least 90% by weight, more preferably at least 95% by weight, even more preferably at least 97% by weight, most preferably at least 99% by weight relative to the total weight of said polypropylene composition.

Preferably, the polypropylene composition comprises at least one additive selected from the group consisting of nucleating agents, antistatic agents, processing aids and blends of any of these, such as a blend of nucleating agent(s) and antistatic agent(s) or a blend of nucleating agent(s) and processing aid(s) or a blend of antistatic agent(s) and processing aid(s) or a blend of all three. Examples of nucleating agents, antistatic agents and processing aids are described in WO 2012/072776 (page 11, line 4-page 16, line 16).

In an embodiment, the polypropylene composition may also comprise further additives, such as by way of example, antioxidants, light stabilizers, acid scavengers, lubricants and colorants. An overview of such additives may be found in Plastics Additives Handbook, ed. H. Zweifel, $5^{th}$ edition, 2001, Hanser Publishers.

Preferably, the polypropylene composition may have notched Izod impact strength of at least 2.8 as measured according to ISO 180/A: 2000 at 23° C. For example, the composition may have notched Izod impact strength lower than 25 kJ/m², preferably lower than 20 kJ/m², preferably lower than 10 kJ/m², preferably lower than 5 kJ/m², preferably between 3.0 and 4.0 kJ/m².

Preferably, the polypropylene composition according to the present invention may have a flexural modulus of at least 1000 MPa, preferably at least 1040 MPa, the flexural modulus being measured at 23° C. according to ISO 178: 2011 method A.

Preferably, the haze of the non-nucleated polypropylene composition is less than 70%, more preferably less than 65%, preferably less than 60%, preferably less than 55%, the haze being determined according to ISO 14782:1999.

According to the invention, first and second polypropylenes are produced by polymerization of propylene and one or more optional co-monomers, optionally in the presence of hydrogen, in the presence of one or more metallocene-based catalytic systems, preferably comprising one or more metallocenes, a support and one or more activating agent. Such metallocene-based catalytic systems are known to the person skilled in the art and need not be explained in detail.

The term "metallocene catalyst" or "metallocene" for short is used herein to describe any transition metal complexes comprising metal atoms bonded to one or more ligands. The preferred metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives.

Preferably the metallocene catalyst comprises a bridged metallocene component, an activating agent and optionally a support.

The metallocene component used to prepare the polypropylene can be any bridged metallocene known in the art. Preferably it is a metallocene represented by the following general formula.

$$-R^1(C^4)(C^4)MX^1X^2 \qquad (I)$$

wherein
each $C^4$ is independently cyclopentadienyl, indenyl, tetrahydroindenyl or fluorenyl, each $C^4$ being optionally substituted by one or more $R^2$;
the bridge $R^1$ is $-(CR^3R^4)_p-$ or $-(SiR^3R^4)_p-$ with p=1 or 2, preferably it is $-(SiR^{10}R^{11})-$;
M is a metal selected from Ti, Zr and Hf, preferably it is Zr;
$X^1$ and $X^2$ are independently selected from the group consisting of halogen, hydrogen, $C_1$-$C_{10}$ alkyl, $C_6$-$C_{15}$ aryl, alkylaryl with $C_1$-$C_{10}$ alkyl and $C_6$-$C_{15}$ aryl;
each $R^2$, $R^3$, and $R^4$ are each independently selected from the group consisting of hydrogen, $C_1$-$C_{10}$ alkyl, $C_5$-$C_7$ cycloalkyl, $C_6$-$C_{15}$ aryl, alkylaryl with $C_1$-$C_{10}$ alkyl and $C_6$-$C_{15}$ aryl, or any two neighboring R may form a cyclic saturated or non-saturated $C_4$-$C_{10}$ ring; each of said alkyl, cycloalkyl, aryl, alkylaryl optionally contains one or more heteroatoms from groups 14-16; each $R^2$, $R^3$, and $R^4$, may in turn be substituted, for example by one or more halogen, such as fluoro, or chloro. Such heteroatom is preferably O, N or S, preferably O.

The preferred metallocene components are represented by the general formula (I), wherein
the bridge $R^1$ is $SiR^3R^4$;
M is Zr;
$X^1$ and $X^2$ are independently selected from the group consisting of halogen, hydrogen, and $C_1$-$C_{10}$ alkyl; and
each $C^4$ is indenyl of the general formula $C_9R^5R^6R^7R^8R^9$, wherein $R^5$, $R^6$, $R^7$, $R^8$, and $R^9$, are each independently selected from the group consisting of hydrogen, $C_1$-$C_{10}$ alkyl, $C_5$-$C_7$ cycloalkyl, $C_6$-$C_{15}$ aryl, and alkylaryl with $C_1$-$C_{10}$ alkyl and $C_6$-$C_{15}$ aryl, or any two neighboring R may form a cyclic saturated or non-saturated $C_4$-$C_{10}$ ring; each of said alkyl, cycloalkyl, aryl, alkylaryl optionally contains one or more heteroatoms from groups 14-16; each $R^5$, $R^6$, $R^7$, $R^8$, and $R^9$, may in turn be substituted, for example by one or more halogen, such as fluoro, or chloro. Such heteroatom is preferably O, N or S, preferably O.

$R^3$ and $R^4$ are each independently selected from the group consisting of $C_1$-$C_{10}$ alkyl, $C_5$-$C_7$ cycloalkyl, and $C_6$-$C_{15}$ aryl, or $R^{10}$ and $R^{11}$ may form a cyclic saturated or non-saturated $C_4$-$C_{10}$ ring; each of said alkyl, cycloalkyl, aryl, optionally contains one or more heteroatoms from groups 14-16; each $R^3$, and $R^4$, may in turn be substituted, for example by one or more halogen, such as fluoro, or chloro. Such heteroatom is preferably O, N or S, preferably O.

Particularly suitable metallocenes are those having $C_2$-symmetry.

Non-limiting examples of particularly suitable metallocenes are:
methyl(cyclohexyl)silanediyl-bis[(2-methyl-4-(4-tert-butylphenyl)indenyl]zirconium dichloride; dimethylsilanediyl-bis(cyclopentadienyl)zirconium dichloride; dimethylsilanediyl-bis(2-methyl-cyclopentadienyl)zirconium dichloride; dimethylsilanediyl-bis(3-methyl-cyclopentadienyl)zirconium dichloride; dimethylsilanediyl-bis(2-tert-butyl-cyclopentadienyl)zirconium dichloride; dimethylsilanediyl-bis(3-tert-butyl-cyclopentadienyl)zirconium dichloride; dimethylsilanediyl-bis(2-tert-butyl-5-methyl-cyclopentadienyl)zirconium dichloride; dimethylsilanediyl-bis(3-tert-butyl-5-methyl-cyclopentadienyl)zirconium dichloride; dimethylsilanediyl-bis(2,4-dimethyl-cyclopentadienyl)zirconium dichloride; dimethylsilanediyl-bis(indenyl)zirconium dichloride; dimethylsilanediyl-bis(2-methyl-indenyl)zirconium dichloride; dimethylsilanediyl-bis(3-methyl-indenyl)zirconium dichloride; dimethylsilanediyl-bis(2-isopropyl-indenyl)zirconium; dimethylsilanediyl-bis(3-isopropyl-indenyl)zirconium dichloride; dimethylsilanediyl-bis(2-tert-butyl-indenyl)zirconium dichloride; dimethylsilanediyl-bis(3-tert-butyl-indenyl)zirconium dichloride; dimethylsilanediyl-bis(4,7-dimethyl-indenyl)zirconium dichloride; dimethylsilanediyl-bis(2,7-dimethyl-4-isoproyl-indenyl)zirconium dichloride; dimethylsilanediyl-bis(2-methyl-4,6-diisoproyl-indenyl)zirconium dichloride; dimethylsilanediyl-bis(tetrahydroindenyl)zirconium dichloride; dimethylsilanediyl-bis(benzindenyl)zirconium dichloride; dimethylsilanediyl-bis(2-methyl-4,5-benzindenyl)zirconium dichloride; dimethylsilanediyl-bis(2-ethyl-4,5-benzindenyl)zirconium dichloride; dimethylsilanediyl-bis (3,3'-2-methyl-benzindenyl)zirconium dichloride; dimethylsilanediyl-bis(4-phenyl-indenyl)zirconium dichloride; dimethylsilanediyl-bis(2-methyl-4-phenyl-indenyl)zirconium dichloride; dimethylsilanediyl-bis(2-ethyl-4-phenyl-indenyl)zirconium dichloride; dimethylsilanediyl-bis(2-methyl-4-isopropyl-indenyl)zirconium dichloride; dimethylsilanediylbis(2-methyl-4-[3',5'-dimethylphenyl]indenyl)zirconium dichloride; dimethylsilanediylbis(2-methyl-4-[4'-tert-butyl-phenyl]indenyl)zirconium dichloride; dimethylsilanediylbis(2-methyl-4-[4'-tert-butylphenyl]indenyl)-zirconium dichloride; dimethylsilanediylbis(2-ethyl-4-[4'-tert-butylphenyl]indenyl)zirconium dichloride; dimethylsilanediylbis(2-propyl-4-[4'-tert-butylphenyl]indenyl)zirconium dichloride; dimethylsilanediylbis(2-isopropyl-4-[4'-tert-butylphenyl]indenyl)zirconium dichloride; dimethylsilanediylbis(2-n-butyl-4-[4'-tert-butylphenyl]indenyl)zirconium dichloride; dimethylsilanediylbis(2-hexy-4-[4'-tert-butylphenyl]indenyl)zirconium dichloride; ethylene-bis(indenyl)zirconium dichloride; ethylene-bis(tetrahydroindenyl)zirconium dichloride; and isopropylidene-(3-tert-butyl-5-methyl-cyclopentadienyl)(fluorenyl) zirconium dichloride.

The preferred metallocene component to produce the inventive polypropylene are dimethylsilyl-bridged bis(indenyl)zirconium dichloride, and among them dimethylsilyl bridged-bis(indenyl)zirconium dichloride wherein indenyl is substituted, such as: methyl(cyclohexyl)silanediyl-bis[(2-methyl-4-(4-tert-butylphenyl)indenyl]zirconium dichloride, dimethylsilanediyl-bis(2-methyl-indenyl)zirconium dichloride; dimethylsilanediyl-bis(tetrahydroindenyl)zirconium dichloride; dimethylsilanediyl-bis(benzindenyl)zirconium dichloride; dimethylsilanediyl-bis(4-phenyl-indenyl)zirconium dichloride; and dimethylsilanediyl-bis(2-methyl-4-phenyl-indenyl)zirconium dichloride.

The metallocene may be supported according to any method known in the art. In the event it is supported, the support used in the present invention can be any organic or inorganic solid, particularly porous supports such as talc, inorganic oxides, clays and clay minerals, ion-exchanged layered compounds, diatomaceous earth compounds, zeolites or a resinous support material, such as a polyolefin, for example. Preferably, the support material is an inorganic oxide in its finely divided form. Specific inorganic oxides include silica, alumina, magnesia, titania and zirconia, for example. Preferably, the inorganic support may comprise silica and/or alumina, the silica can be titanated. The inorganic support may comprise from 10 to 100% by weight of silica and/or preferably from 10 to 100% by weight of alumina.

In some embodiments, alumoxane is used as an activating agent. As used herein, the term "alumoxane" and "aluminoxane" are used interchangeably, and refer to a substance, which is capable of activating the metallocene catalyst. In an embodiment, alumoxanes comprise oligomeric linear and/or cyclic alkyl alumoxanes. In a further embodiment, the alumoxane has formula (II) or (III):

 (II)

for oligomeric, linear alumoxanes; or

 (III)

for oligomeric, cyclic alumoxanes
wherein x is 1-40, and preferably 10-20;
wherein y is 3-40, and preferably 3-20; and
wherein each $R^a$ is independently selected from a $C_1$-$C_8$ alkyl, and preferably is methyl. In a preferred embodiment, the alumoxane is methylalumoxane (MAO).

In a preferred embodiment, the metallocene catalyst is a supported metallocene-alumoxane catalyst comprising a metallocene and an alumoxane which are bound on a porous silica support.

One or more aluminiumalkyl represented by the formula $AlR^b_x$ can be used as additional co-catalyst, wherein each $R^b$ is the same or different and is selected from halogens or from alkoxy or alkyl groups having from 1 to 12 carbon atoms and x is from 1 to 3. Non-limiting examples are Tri-Ethyl Aluminum (TEAL), Tri-Iso-Butyl Aluminum (TIBAL), Tri-Methyl Aluminum (TMA), and Methyl-Methyl-Ethyl Aluminum (MMEAL). Especially suitable are trialkylaluminums, the most preferred being triisobutylaluminum (TIBAL) and triethylaluminum (TEAL). The alkyl aluminium can be used in combination with a perfluoroborate e.g. $[Ph_3C][B(C_6F_5)_4]$ or $[Me_2NPhH][B(C_6F_5)_4]$. For example, using a combination of $[Ph_3C][B(C_6F_5)_4]$/TIBAL or of $[Me_2NPhH][B(C_6F_5)_4]$/TIBAL.

The present invention also encompasses a process for preparing a polypropylene composition. Said process comprises the steps of:
(i) providing a first polypropylene which is a metallocene-catalyzed homopolymer or a metallocene-catalyzed random copolymer of propylene and of a co-monomer, having at most 0.5% by weight of co-monomer content, relative to the total weight of the random copolymer, as determined by $^{13}C$ NMR analysis,
(ii) providing a second polypropylene which is a metallocene-catalyzed random copolymer of propylene and said co-monomer,
(iii) obtaining the polypropylene composition comprising said first and second polypropylene.

The first polypropylene and second polypropylene provided in steps (i) and (ii) of the present process are prepared by polymerizing propylene, if any a co-monomer, optionally in the presence of hydrogen, in presence of a metallocene-catalyst as described above.

The polymerization can be carried out according to known techniques in one or more polymerization reactors. The polymerization is preferably performed in liquid propylene at temperatures in the range from 20° C. to 100° C. Preferably, temperatures are in the range from 60° C. to 80° C. The pressure can vary from 5 to 50 bars, preferably from 5 to 40 bars.

The amount of co-monomer to be injected in said one or more polymerization reactors may be determined such as to obtain the required co-monomer content in said first polypropylene and in said second polypropylene.

Addition of hydrogen in the polymerization medium may be controlled to prepare said polypropylene composition. The amount of hydrogen added is determined to obtain the required melt flow index values.

The polymerization process can be carried out in solution, slurry or gas phase. The slurry process can be carried out in a reactor suitable for such processes, such as continuously stirred tank reactors (CSTRs) or slurry loop reactors (in particular liquid full loop reactors). The pressure in the reactor can vary from 0.5 to 50 bars, preferably from 5 to 40 bars.

In some embodiments, two or more reactors, or two or more reaction zones of the same reactor, may be connected in series or in parallel, more preferably in series, in order to produce the first polypropylene and/or second polypropylene for use herein.

In a preferred embodiment, the composition is prepared by physically blending the first and the second polymer.

The blending of the components of the polymer composition can be carried out according to any physical blending method and combinations thereof known in the art. This can be, for instance, dry blending, wet blending or melt blending. The blending conditions depend upon the blending technique involved.

If dry blending is employed, the dry blending conditions may include temperatures from room temperature up to just under the lowest melting temperature of the polymers employed. The components can be dry blended prior to a melt blending stage, which can take place for example in an extruder. Melt processing makes use of standard equipment of the thermoplastics industry. The components can be melt blended in a batch process such as in a Brabender Internal Mixer, Banbury, Haake or Clextral extruder or in a continuous process, such as in an extruder e.g. a single or twin screw extruder. The time required for the melt blending can vary broadly and depends on the method of blending employed. The time required is the time sufficient to thoroughly mix the components.

In an alternate embodiment, the composition is obtained by chemical blending of said first and second polypropylene (i.e.) by mixing said first polypropylene to the second polypropylene simultaneously to the preparation thereof. When the second polypropylene is prepared without being isolated, the melt flow index can be determined using power law equation (1):

$$(MFI_{tot})^{-0.23} = \omega_{HMW}(MFI_{HMW})^{-0.23} + (1-\omega_{HMW}) \times (MFI_{LMW})^{-0.23} \quad \text{(Equation (1))}$$

wherein $MFI_{HMW}$ refers to the melt flow index of the high molecular weight polypropylene, $MFI_{tot}$ refers to the melt flow index of the polypropylene composition, $MFI_{LMW}$ refers to the melt flow index of the low molecular weight polypropylene and $\omega_{HMW}$ refers to the percentage of the high molecular weight polypropylene in the polypropylene composition.

The polypropylene compositions according to the invention can be obtained by melting and mixing the components, and the mixing is done in a mixing apparatus at temperatures generally of from 180° C. to 250° C., preferably from 180° C. to 200° C. Any known apparatus and technology can be used for this purpose. Useful mixing apparatus in this context are in particular extruders or kneaders, and particular preference is given to twin-screw extruders. It is also possible to premix the components at room temperature in a mixing apparatus.

The polypropylene composition may comprise additives commonly employed in the art, such as for example antioxidants, plasticizers, stabilizing agents (against heat, light, U.V.), acid scavengers, lubricants, antistatic agents, fillers, nucleating agents, clarifying agents, antistatic and water repellant agents, colorants, etc. An overview of useful additives is given in Plastics Additives Handbook, ed. H. Zweifel, 5th edition, Hanser Publishers.

Preferably, the composition is obtained by a process comprising the step of blending, preferably melt blending:

(A) a first polypropylene which is a metallocene-catalyzed homopolymer or a metallocene-catalyzed random copolymer of propylene and of a co-monomer having at most 0.5% by weight of co-monomer content, relative to the total weight of the random copolymer, as determined by $^{13}$C NMR analysis; and (B) a second polypropylene which is a metallocene-catalyzed random copolymer of propylene and of a co-monomer, and optionally one or more nucleating agents.

Preferably, the polypropylene compositions may contain one or more nucleating agents. The nucleating agent used in the present invention can be any of the nucleating agents known to the skilled person. It is, however, preferred that the nucleating agent be selected from the group consisting of sorbitol acetals, talc, carboxylate salts, phosphate ester salts, substituted benzene tricarboxamides and polymeric nucleating agents, as well as blends thereof. Non-limiting examples of sorbitol acetals are dibenzylidene sorbitol (DBS); such as 1,3:2,4 dibenzylidene sorbitol); $C_1$-$C_8$-alkyl-substituted dibenzylidene sorbitol such as bis(p-methyl-dibenzylidene sorbitol) (MDBS), bis(p-ethyl-dibenzylidene sorbitol), bis(3,4-dimethyl-dibenzylidene sorbitol) (DMDBS), and bis(4-propylbenzylidene) propyl sorbitol; or substituted nonitol-derivatives, such as 1,2,3,-trideoxy-4,6:5,7-bis-O-[(4-propylphenyl)methylene]-nonitol. Non-limiting examples of carboxylate salts which can be used as nucleating agents can be organocarboxylic acid salts. Particular examples are sodium benzoate and lithium benzoate. The organocarboxylic acid salts may also be alicyclic organocarboxylic acid salts, preferably bicyclic organodicarboxylic acid salts and more preferably a bicyclo[2.2.1]heptane dicarboxylic acid salt. Examples of phosphate ester salts are salts of 2,2'-methylene-bis-(4,6-di-tert-butylphenyl) phosphate.

While it is clear to the skilled person that the amount of nucleating agent to be added depends upon its crystallization efficiency, for the purposes of the present invention the nucleating agent or the blend of nucleating agents can be present in the polypropylene composition in an amount of at least 50 ppm by weight based on the total weight of the composition, preferably at least 100 ppm by weight. It is present in an amount of at most 10000 ppm by weight, preferably of at most 5000 ppm by weight, more preferably of at most 4000 ppm by weight.

Preferably, the composition are obtained by a process comprising the steps of (a) blending, preferably melt blending:

(A) a first polypropylene which is a metallocene-catalyzed homopolymer or a metallocene-catalyzed random copolymer of propylene and of a co-monomer having at most 0.5% by weight of co-monomer content, relative to the total weight of the random copolymer, as determined by $^{13}$C NMR analysis; and (B) a second polypropylene which is a metallocene-catalyzed random copolymer of propylene and of a co-monomer, and optionally one or more nucleating agents.

(b) extruding the blend, (c) processing the extruded blend into an article. Preferably, said processing step comprises using one or more polymer known processing techniques.

The polypropylene composition of the present invention may be transformed into articles by a transformation method selected from the group comprising injection moulding, blow moulding, injection stretch blow moulding, melt blown, cast or blown film extrusion, sheet extrusion.

The present invention therefore also encompasses an article comprising a polypropylene composition as defined herein; or obtained according to a process as defined herein. In some embodiments, said article can be film products, injection moulded articles blow moulded articles, etc., preferably a film. Preferred embodiments for polypropylene composition of the invention are also preferred embodiments for the article of the invention.

The invention also encompasses a process for preparing an article according to the invention. Preferred embodiments as described above are also preferred embodiments for the present process.

The invention also encompasses the use of a polypropylene composition according to the invention, in film applications, and injection and blow moulding applications.

The invention will now be illustrated by the following, non-limiting illustrations of particular embodiments of the invention.

EXAMPLES

Test Methods
Melt Index

The melt flow index ($MI_2$) of polypropylene was determined according to ISO 1133:2005 Method B, condition M, at a temperature 230° C., and a 2.16 kg load using a die of 2.096 mm.

$MI_{105}$ was used to measure melt indexes higher than 300 g/10 min. $MI_{105}$ was determined at a temperature 190° C., and a 2.16 kg load using a die of 1.0 mm.

Correlation between the above two MI measures was determined by measuring the melt flow index of several polypropylene grades using both methods. The results are shown in Table 1. Polypropylene Lumicene® MR 2002 and Polypropylene Lumicene® MH140 are metallocene-catalyzed propylene homopolymers (mPPH) commercially available from TOTAL Refining & Chemicals. Lumicene® MR30MC2, and Lumicene® MR60MC2 are metallocene-catalyzed random copolymer polypropylenes (mPPR) commercially available from TOTAL Refining & Chemicals. mPPR-3 is a metallocene-catalyzed random propylene copolymer (synthesis described below). mPPH-1 is a metallocene-catalyzed propylene homopolymer (synthesis described below). All samples were powders (fluff), 1% by weight of BHT (2,6-tertbutyl-4-methylphenol) was added before the analysis.

TABLE 1

| Grade | Nature | $MI_2$ meas. (g/10 min) | $MI_{105}$ meas. (g/10 min) |
|---|---|---|---|
| MR2002 | mPPH | 17.9 | 0.96 |
| MH140 | mPPH | 150.5 | 9.21 |
| MH140 | mPPH | 146.3 | 9.25 |
| mPPR-3 | mPPR | 11.0 | 0.66 |
| MR30MC2 | mPPR | 31.0 | 1.87 |
| MR60MC2 | mPPR | 67.7 | 4.09 |
| mPPH-1 | mPPH | 288.5 | 17.2 |

A linear correlation was found, with a coefficient of 16.57 between $MI_{105}$ and $MI_2$ as shown in FIG. 1. The linear regression gave a very good correlation factor ($r^2=0.999$) and the slope corresponds to the ratio $MI_2/MI_{105}$. The calculated coefficient was used to calculate very low melt index.

Molecular Weight, Molecular Distribution, and Co-Monomer Distribution

The molecular weight ($M_n$ (number average molecular weight), $M_w$ (weight average molecular weight) and molecular weight distributions D ($M_w/M_n$), and D' ($M_z/M_w$) were determined by size exclusion chromatography (SEC) and in particular by IR-detected gel permeation chromatography (GPC) at high temperature (145° C.). Briefly, a GPC-IR5MCT from Polymer Char was used: 10 mg polymer sample was dissolved at 160° C. in 10 ml of trichlorobenzene stabilized with 1000 ppm by weight of butylhydroxytoluene (BHT) for 1 hour. Injection volume: about 400 µl, automatic sample preparation and injection temperature: 160° C. Column temperature: 145° C. Detector temperature: 160° C. Column set: two Shodex AT-806MS (Showa Denko) and one Styragel HT6E (Waters), columns were used with a flow rate of 1 ml/min. Mobile Phase: trichlorobenzene stabilized with 1000 ppm by weight of butylhydroxytoluene (BHT) filtered through a 0.45 µm PTFE filter. Detector: Infrared detector (2800-3000 $cm^{-1}$) to measure the concentration, one narrow filter center based at 2928 $cm^{-1}$, and one narrow filter center based at 2959 $cm^{-1}$. Calibration: narrow standards of polystyrene (PS) (commercially available).

Calculation for polypropylene of molecular weight $M_i$ of each fraction i of eluted polymer is based on the Mark-Houwink relation $\log_{10}(M_{PP})=\log_{10}(M_{PS}) -0.25323$ (cut off on the low molecular weight end at $M_{PP}=1000$).

The molecular weight averages used in establishing molecular weight/property relationships are the number average ($M_n$), weight average ($M_w$) and z-average ($M_z$) molecular weight.

These averages are defined by the following expressions and are determined form the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i W_i} = \frac{\sum_i h_i M_i}{\sum_i h_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight $M_i$. The third representation in each case (farthest right) defines how one obtains these averages from SEC chromatograms. hi is the height (from baseline) of the SEC curve at the $i_{th}$ elution fraction and $M_i$ is the molecular weight of species eluting at this increment.

Co-Monomer Distribution

Figure 3:
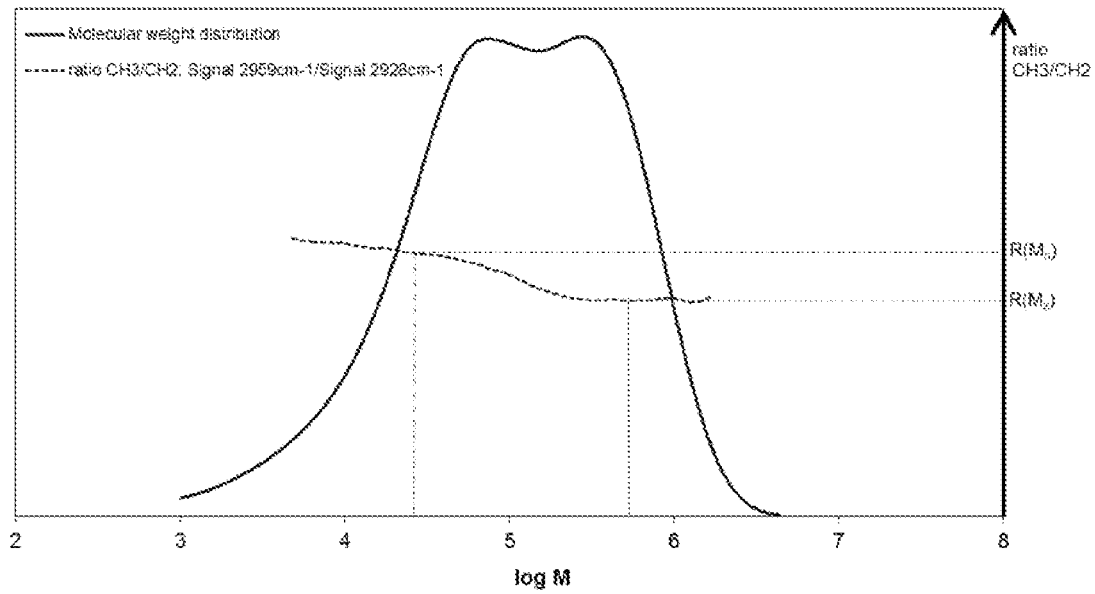
FIG. 3 represents a graph plotting the molecular weight distribution (weight fraction (area normalized) as a function of logarithm of molecular weight) and the ratio of the areas of IR signals ($A_{CH3}/A_{CH2}$) from IR5-MCT detector as function of log M for Blend 4 according to the invention.

Co-monomer distribution illustrated by the $CH_3/CH_2$ ratio across the molecular weight distribution was also determined using the SEC apparatus described above equipped with an integrated high-sensitivity multiple band IR detector (IR5-MCT) as described by A. Ortin et al. (Macromol. Symp. 330, 63-80 2013 and T. Frijns-Bruls et al. Macromol. Symp. 356, 87-94 2015). The IR5-MCT detector included two narrow band filters tuned to the absorption region assigned to $CH_3$ (centered on 2959 $cm^{-1}$) and $CH_2$ groups (centered on 2928 $cm^{-1}$). The detector produced separate and continuous streams of absorbance data, measured through each of their IR selective filters at a fixed acquisition rate of one point per second. The detector was equipped with a heated flow-through cell of 13 µL internal volume. For each sample, six different preparations at the same concentration were analyzed. Final results were obtained by averaging the data. The presence of co-monomer was related to the ratio R of the signal at 2959 $cm^{-1}$ ($CH_3$) on the signal at 2928 $cm^{-1}$ ($CH_2$). This ratio were measured at $M=M_n$ and at M=$M_z$. Then, for each resin, the ratio of R($M_z$) on R($M_n$) were compared (FIG. 3 illustrate the calculation scheme).

Differential Scanning Calorimetry (DSC) for Determination of Crystallization and Melting Temperatures.

Peak crystallization temperature ($T_c$), peak melting temperature ($T_m$) and heat of fusion (Δ¾) were measured via Differential Scanning using DQ 2000 instrument by TA Instruments, calibrated with indium and using T zero mode. The polymer analysis was performed with a 2 to 10 mg of polymer sample. The sample was first equilibrated at 40° C. and subsequently heated to 220° C. using a heating rate of 20° C./min (first heat). The sample was held at 220° C. for 3 min to erase any prior thermal and crystallization history. The sample was subsequently cooled down to 30° C. with a constant cooling rate of 20° C./min (first cool). The sample was held isothermal at 30° C. for 2 min before being heated to 220° C. at a constant heating rate of 20° C./min (second heat). The exothermic peak of crystallization (first cool) was analyzed using the TA Universal Analysis software and the peak crystallization temperature ($T_c$) corresponding to 20° C./min cooling rate was determined. The endothermic peak of melting (second heat) was also analyzed using the TA Universal Analysis software and the peak melting temperature ($T_m$) corresponding to 20° C./min heating rate was determined. Unless otherwise indicated, reported values of $T_c$, $T_m$ in this invention refer to a cooling and heating rate of 20° C./min, respectively.

Tacticity

The term "tacticity" refers to the arrangement of pendant groups in a polymer. For example, a polymer is "atactic" when its pendant groups are arranged in a random fashion on both sides of the chain of the polymer. In contrast, a polymer is "isotactic" when all of its pendant groups are arranged on the same side of the chain and "syndiotactic" when its pendant groups alternate on opposite sides of the chain.

The tacticity was determined by $^{13}$C-NMR. The $^{13}$C-NMR analysis was performed at an operative frequency of 125 MHz using a 500 MHz Bruker NMR spectrometer with a high temperature 10 mm cryoprobe under conditions such that the signal intensity in the spectrum is directly proportional to the total number of contributing carbon atoms in the sample. Such conditions are well known to the skilled person and include for example sufficient relaxation time, etc. In practice, the intensity of a signal is obtained from its integral, i.e. the corresponding area. The data were acquired using proton decoupling, 240 scans per spectrum, a pulse repetition delay of 11 seconds and a spectral width of 26000 Hz at a temperature of 130° C.

The sample was prepared by dissolving a sufficient amount of polymer in 1,2,4-trichlorobenzene (TCB, 99%, spectroscopic grade) at 130° C. and occasional agitation to homogenize the sample, followed by the addition of hexadeuterobenzene ($C_6D_6$, spectroscopic grade) and a minor amount of hexamethyldisiloxane (HMDS, 99.5+%), with HMDS serving as internal standard. To give an example, about 200 mg of polymer were dissolved in 2.0 mL of TCB, followed by addition of 0.5 mL of $C_6D_6$ and 2 to 3 drops of HMDS.

Following data acquisition, the chemical shifts are referenced to the signal of the internal standard HMDS, which is assigned a value of 2.03 ppm.

The isotacticity is determined by $^{13}$C—N MR analysis on the total polymer. In the spectral region of the methyl groups the signals corresponding to the pentads mmmm, mmmr, mmrr and mrrm are assigned using published data, for example A. Razavi, Macromol. Symp., vol. 89, pages 345-367. Only the pentads mmmm, mmmr, mmrr and mrrm are taken into consideration due to the weak intensity of the signals corresponding to the remaining pentads. For the signal relating to the mmrr pentad a correction is performed for its overlap with a methyl signal related to 2.1-insertions. The percentage of mmmm pentads is then calculated according to % mmmm=AREAmmmm/(AREAmmmm+ AREAmmmr+AREAmmrr+AREAmrrm)*100

The regiodefects content in the polypropylene composition is the percentage of 2.1-insertions in the polypropylene composition. The determination of the percentage of 2.1-insertions is detailed herein with respect to ethylene as co-monomer but can be applied with other co-monomers.

The determination of the percentage of 2.1-insertions for a random copolymer of propylene with ethylene as comonomer is determined by two contributions:

(i) the percentage of 2.1-insertions as defined above for the propylene homopolymer, and (ii) the percentage of 2.1-insertions, wherein the 2,1-inserted propylene neighbors an ethylene, thus the total percentage of 2.1-insertions corresponds to the sum of these two contributions. For a propylene homopolymer, the signals corresponding to the 2.1-insertions are identified with the aid of published data, for example H. N. Cheng, J. Ewen, Makromol. Chem., vol. 190 (1989), pages 1931-1940. A first area, AREA1, is defined as the average area of the signals corresponding to 2.1-insertions. A second area, AREA2, is defined as the average area of the signals corresponding to 1,2-insertions. The assignment of the signals relating to the 1,2-insertions is well known to the skilled person and need not be explained further. The percentage of 2.1-insertions is calculated according to 2.1-insertions (in %)=AREA1/(AREA1+AREA2) *100 with the percentage in 2.1-insertions being given as the molar percentage of 2,1-inserted propylene with respect to total propylene.

The assignments of the signal for case (ii) can be done either by using reference spectra or by referring to the published literature.

Co-Monomer Content and Randomness

Co-monomer content of the polypropylene composition: The total co-monomer content (in particular ethylene ($C_2$) i.e. % by weight $C_2$) relative to the total weight of polypropylene of the composition was determined using $^{13}$C NMR.

Co-monomer content of the random copolymer (PPR): The percentage by weight of ethylene incorporated in the metallocene-catalyzed random propylene copolymer with ethylene as comonomer was determined using $^{13}$C NMR.

The sample was prepared by dissolving a sufficient amount of polymer in 1,2,4-trichlorobenzene (TCB 99% spectroscopic grade) at 130° C. and occasional agitation to homogenize the sample, followed by the addition of hexadeuterobenzene ($C_6D_6$, spectroscopic grade) and a minor amount of hexamethyldisiloxane (HMDS, 99.5+%), with HMDS serving as internal standard. To give an example, about 600 mg of polymer were dissolved in 2.0 ml of TCB, followed by addition of 0.5 ml of $C_6D_6$ and 2 to 3 drops of HMDS.

$^{13}$C NMR signal was recorded on a Bruker 500 MHz with a 10 mm probe using the conditions listed in Table 2.

TABLE 2

| | |
|---|---|
| Pulse angle: | 90° |
| Pulse repetition time: | 20 s |
| Spectral width: | 25000 Hz centered at 95 ppm |
| Data points: | 64K |
| Temperature: | 130° C. +/− 2° C. |
| Rotation: | 15 Hz |
| Scan numbers: | 2000-4000 |
| Decoupling sequence: | inverse-gated decoupling sequence to avoid NOE effect |

$^{13}$C{$^{1}$H} NMR spectrum was obtained by Fourier Transform on 131 K points after a light Gaussian multiplication. Spectrum was phased, baseline corrected and chemical shift scale was referenced to the internal standard HMDS at 2.03 ppm.

Figure 2:
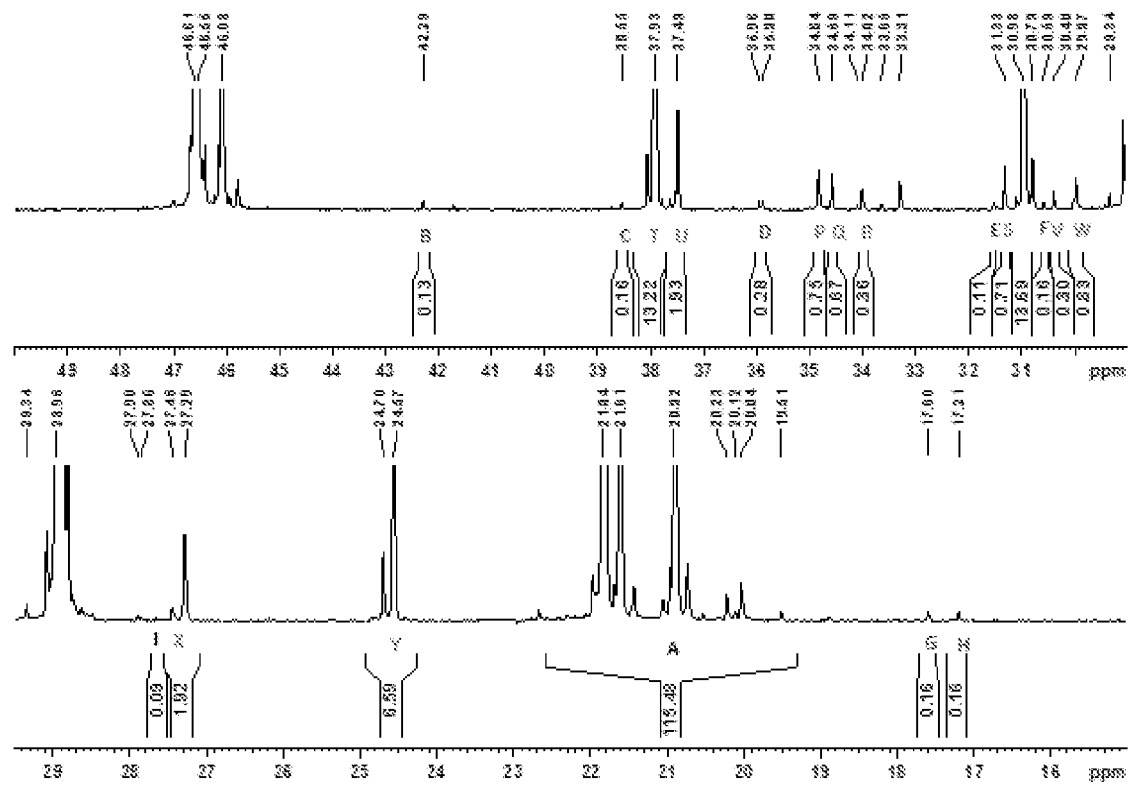
FIG. 2 represents an example of the $^{13}$C NMR spectrum of metallocene-catalyzed random propylene-ethylene copolymer containing about 5% by weight of ethylene.

Chemical shifts of signals are peak picked and peaks are integrated shown in FIG. 2 and in the following Table 3.

TABLE 3

| Region | Shift (ppm) |
|---|---|
| A | 22.80-19.6 |
| B | 42.37-42.18 |
| C | 38.64-38.43 |
| D | 36.04-35.81 |
| E | 31.6-31.49 |
| F | 30.63-30.51 |
| G | 17.71-17.49 |
| H | 17.31-17.10 |
| I | 27.74-27.54 |
| P | 34.92-34.73 |
| Q | 34.67-34.50 |
| R | 34.06-33.9 |
| S | 31.4-31.21 |
| T | 38.34-37.7 |
| U | 37.7-37.37 |
| V | 30.46-30.31 |
| W | 30.12-29.84 |
| X | 27.55-27.10 |
| Y | 24.94-24.26 |

Chemical shits are given at +/−0.05 ppm.
The main peak A is indicative of 1.2 PP units.
Peak I is indicative of 1.3 PP units.
Peaks B, C, D, E, F, G, H are indicative of 2.1 PP units.
Peaks T, U, V, W, X, Y are indicative of ethylene incorporation in 1.2 PP unit
Peaks P, Q, R, S are indicative of ethylene incorporation after 2.1 PP unit
The % by weight of the C2 content is obtained by the following areas (A) combination $A_{C3\ 1,2} = A_A$
$A_{C3\ 2,1} = (A_B + A_C + A_D + A_E + A_F + A_G + A_H)/7 + (0.5*A_P + 0.5*A_Q + 0.5*A_S)/3$
$A_{C3\ 1,3} = A_I/2$
$A_{C2\ E1\ 1,2} = (0.5*A_T + A_Y)/2$
$A_{C2\ E2\ 1,2} = (A_U - A_T + A_X)/2 - A_V$
$A_{C2\ E3\ 1,2} = ((A_U - A_T - A_T)*0.5 + (A_X - A_V)*0.5 + A_V + A_W + A_X + A_Y)/2 - A_{C2\ E1\ 1,2} - A_{C2\ E2\ 1,2}$
$A_{C2\ 2,1} = (0.5*A_P + 0.5*A_Q + 0.5*A_S + A_R)/4$
$A_{C2} = (A_{C2\ E1,2} + A_{C2\ E2\ 1,2} + A_{C2\ E3\ 1,2} + A_{C2\ 2,1})$
$A_{C3} = (A_{C3\ 1,2} + A_{C3\ 2,1} + A_{C3\ 1,3})$
% (wt.) C2 = $(28*A_{C2})/(28*A_{C2} + 42*A_{C3}) \times 100$
Randomness (%) = $A_{C2\ E1\ 1,2}/A_{C2}$ Test Specimen The compositions were injected on a Netstal 60 injection moulding machine to produce injection molded ISO bars in accordance with ISO 294-1:2017.

Notched Izod Impact Strength

Notched Izod Impact Strength was measured according to ISO 180/A 2000 at 23° C., V notch sample type 1A, with the conditions listed in Table 4. Izod impact is defined as the kinetic energy needed to initiate a fracture in a polymer sample specimen and continue the fracture until the specimen is broken. Tests of the Izod impact strength determine the resistance of a polymer sample to breakage by flexural shock as indicated by the energy expended from a pendulum type hammer in breaking a standard specimen in a single blow. The specimen is notched which serves to concentrate the stress and promote a brittle rather than ductile fracture. Specifically, the Izod impact test measures the amount of energy lost by the pendulum during the breakage of the test specimen. The energy lost by the pendulum is the sum of the energies required to initiate sample fracture, to propagate the fracture across the specimen, and any other energy loss associated with the measurement system (e.g., friction in the pendulum bearing, pendulum arm vibration, sample toss energy, etc.).

TABLE 4

| | |
|---|---|
| Temperature | 23° C. |
| Norm | ISO 180:2000 |
| Impact energy | 1.00 J |
| Impact velocity | 3.5 m/s |
| Notch type | V-Notch Type 1A |
| Test specimen | bar 80 mm × 10 mm × 4 mm cut from type 1A specimen |

Flexural Modulus

The flexural modulus was determined according to ISO 178:2011 method A with the conditions listed in Table 5.

TABLE 5

| | |
|---|---|
| Temperature | 24.5° C. |
| Test machine | 00-0311 (Zwick tensile testing machine) |
| Force sensor | 500N cell |
| Displacement transducer | Extensometer |
| Norm | ISO-178:2011 method A |
| Test specimen | bar 80 mm × 10 mm × 4 mm cut from type 1A specimen |
| Pre-charge | 0.5N |
| Test speed | 2 mm/min |
| Span between specimen supports | 64 mm |
| End of the test | 1.5% |
| Relative humidity | 50% ± 10% |

Spiral Flow (240° C. 500 Bars)

Spiral flow measurements were performed by injecting melted polymer into a spiral mold and measuring the length of the resulting spiral. The longer the spiral, the easier the injection. Spiral flow was determined by a Netstal 60 injection moulding machine with a screw having a diameter of 32 mm and an L/D ratio of 25. The melt temperature was 240° C. Injection pressure was set to 500 bar. Mold temperature was kept at 40±1° C. The mould used allows producing a flat ribbon sample of 10 mm width, 1.5 mm of thickness and a length of at most 130 cm. The Temperature profile was either (1): 210-220-230-240-240-240° C. or (2): 230-240-240-240-240-240° C.

Haze

Haze was determined according to ISO 14782:1999 on samples having 1 mm of thickness using incandescent light source, Haze-gard dual from BYK Gardner. The squares were prepared by injecting the compositions on the Netstal 60 injection moulding machine. Injection speed was 120 mm/s. Mold temperature was kept at 40° C. Pressure was maintained at 750 bars. The Temperature profile was 230° C.

Gloss

Gloss was measured in accordance with ASTM D523 at an angle of 60°, on 1 mm thick samples prepared by injection in a mould, with the Byk-Gardner micro-gloss reflectometer according to. A BYK-Gardner glossmeter was used, with a standard having a gloss of 93.9.

Charpy Notched Impact Strength (NIS):

Charpy NIS was determined according to ISO 179-1e1: 2010 on V-notched samples of 80×10×4 mm$^3$ at 23° C. and 0° C. The test specimens were prepared by injection molding according to ISO 294-1, at a temperature of 200° C., a mold at 40° C., a screw of 32 mm, a closure strength of 600 kN and a cycle time of 60 s.

Propylene Homopolymers and Random Co-Polymers Preparation

Three propylene homopolymers (mPPH-1, mPPH-2, mPPH-3) and three random co-polymers (mPPR-1, mPPR-2, m-PPR-3) were prepared by polymerization in liquid propylene. The catalyst used is a supported metallocene catalyst. rac-Methyl(cyclohexyl)silanediyl-bis[(2-methyl-4-(4-tert-butylphenyl)indenyl]zirconium dichloride (n° CAS: 888227-55-2) was used as metallocene component supported on silica which has been previously activated with methylalumoxane (MAO) as described below.

In a 250 mL round bottom flask conditioned under a light nitrogen flow, 25 g of silica was stirred at 60 rpm and dried at 110° C. overnight. 190 mL of dry hexane was then added. The suspension was cooled at 0° C. and 6.4 mL of VertecBip (20:80 weight ratio of Ti(OC$_4$H$_9$)$_4$ to Ti(OC$_3$H$_7$)$_4$) was added dropwise to impregnate the support. The suspension was mixed for 20 hours at 0° C. The solvent was removed under reduced pressure and the resulting silica was dried under a nitrogen flow at 450° C. for 4 hours. The Ti-impregnated silica had a Ti content of 4% by weight.

20 g of the dried silica was introduced in a 500 mL round-bottomed flask. Toluene was added and the suspension was stirred at 100 rpm. MAO (30% by weight in toluene) was dropwise added via a dropping funnel and the resulting suspension was heated at 110° C. (reflux) for 4 hours. The amount of added MAO was calculated to reach the desired Al loading. After the reflux, the suspension was cooled down to room temperature and the mixture was filtered through a glass frit. The recovered powder was washed with toluene and pentane (or iso-hexane) before being dried under reduced pressure overnight. The metallocene was dissolved in AlR$_3$ (R=C$_4$H$_9$). After 1 hour reaction, the MAO-support was slowly added to the metallocene/AlR$_3$ mixture and mixing was carried out for two hours. Solvent was removed by filtration. The cake was washed with iso-hexane. The final catalyst system was filtered and dried at room temperature. The resulting powder was slurried in mineral oil and stored cold.

The polymerization reaction was conducted in a double-loop reactor, (two loop reactors connected in series), pre-polymerization was performed in a smaller loop reactor, connected to the first loop reactor of the double loop reactor. The samples were pelletized and analyzed. The polymerization conditions and results are given in Table 6.

TABLE 6

| Polymer | | | mPPH-1 | mPPH-2 | mPPH-3 | mPPH-4 | mPPR-1 | mPPR-2 | mPPR-3 |
|---|---|---|---|---|---|---|---|---|---|
| | ALKYL | (type) | TeAl | TeAl | TeAl | TeAl | TeAl | TeAl | TeAl |
| | ALKYL | (ppm) | 10 | 7 | 10 | 10 | 10 | 9 | 10 |
| Pre-polymerization | Temperature | (° C.) | 15 | 13 | 14 | 15 | 14 | 14 | 14 |
| | Propylene | (kg/h) | 40.0 | 40.0 | 40.0 | 45.0 | 45.0 | 45.0 | 50 |
| | Hydrogen | (Nl/h) | | | | | | | |
| | Ethylene | (kg/h) | | | | | | | |
| | Residence time | (min) | 6.6 | 6.6 | 6.6 | 6.0 | 6.0 | 6.0 | 5.5 |
| First loop reactor | Temperature | (° C.) | 70 | 70 | 70 | 60 | 60 | 60 | 70 |
| | Propylene | (kg/h) | 42 | 42 | 42 | 42 | 42 | 42 | 42 |
| | Ethylene | (kg/h) | | | | | 3.42 | 4.40 | 1.8 |
| | Hydrogen | (Nl/h) | 37.0 | 51.0 | 59.0 | 4.0 | 0.0 | 0.0 | 25 |
| | Contribution | (wt %) | 76.3 | 79.6 | 72.9 | 51.5 | 77.4 | 82.8 | 59.1 |
| | H$_2$/C$_3$ | | 0.45 | 0.62 | 0.72 | 0.05 | 0.00 | 0.00 | 0.27 |
| | Residence time | (min) | 50 | 49 | 49 | 45 | 48 | 47 | 48 |
| | MI$_{105}$ | (g/10 min) | 14.7 | 35.6 | 66.7 | | | | |
| | MI$_2$ | (g/10 min) | 210 | 510 | 1001 | 0.79 | 0.99 | 0.47 | 10 |
| Second loop Reactor | Temperature | (° C.) | 70 | 70 | 70 | 60 | 60 | 60 | 70 |
| | Propylene | (kg/h) | 80 | 80 | 80 | 80 | 80 | 80 | 45 |
| | Ethylene | (kg/h) | | | | | 2.56 | 4.30 | 1.0 |
| | Hydrogen | (Nl/h) | 36.0 | 48.0 | 57.5 | 4.0 | 0.0 | 0.0 | 11.0 |
| | Contribution | (wt%) | 23.7 | 20.4 | 27.1 | 48.5 | 22.6 | 17.3 | 40.9 |
| | H$_2$/C$_3$ | | 0.45 | 0.60 | 0.72 | 0.05 | 0.00 | 0.00 | 0.24 |
| | Residence time | (min) | 25 | 24 | 24 | 25 | 24 | 24 | 33 |
| | MI$_{105}$ | (g/10 min) | 17.9 | 42.6 | 70.3 | | | | |
| | MI$_2$ | (g/10 min) | 257 | 609 | 1015 | 0.97 | 1.31 | 0.50 | 11.0 |
| | C$_2$ | (wt %) | | | | | 3.3 | 4.9 | 2 |

Example 1

Several compositions according to the invention were prepared and compared with comparative compositions.

When the final melt flow index of the composition needed to be calculated instead of measured, power law equation (1) was used. This relation comes from the linear combination of intrinsic viscosities for each compatible phases. After modifications with Mark-Houwink law and Bremmer-Rudin equation, the power law for melt index was obtained.

$$(MFI_{tot})^{-0.23} = \omega_{HMW}(MFI_{HMW})^{-0.23} + (1-\omega_{HMW}) \times (MFI_{LMW})^{-0.23} \quad \text{(Equation (1))}$$

wherein $MFI_{HMW}$ refers to the melt flow index of the high molecular weight polypropylene, $MFI_{tot}$ refers to the melt flow index of the polypropylene composition, $MFI_{LMW}$ refers to the melt flow index of the low molecular weight polypropylene and $\omega_{HMW}$ refers to the percentage of the high molecular weight polypropylene in the polypropylene composition.

For the calculation of the content of co-monomer in the final composition, a simple linear law was used and described in Equation (2)

$$\% \; C_2^{tot} = \omega_{HMW} \times \% \; C_2^{HMW} + (1-\omega_{HMW}) \times \% \; C_2^{LMW} \quad \text{(Equation (2))}$$

wherein $\% \; C_2^{HMW}$ refers to the ethylene content in percent by weight of the high molecular weight polypropylene, $\% \; C_2^{tot}$ refers to the total ethylene content in percent by weight of the polypropylene composition, $\% \; C_2^{LMW}$ refers to the ethylene content in percent by weight of the low molecular weight polypropylene and $\omega_{HMW}$ refers to the percentage of the high molecular weight polypropylene in the polypropylene composition.

Six compositions according to the invention were prepared (Blends 1-6) and compared to two comparative compositions (Compa 1-2) and two monomodal homopolymer commercial grades (References: MR2001, MR2002) and a random propylene copolymer grade (mPPR-3). Polypropylene Lumicene® MR 2001 is a metallocene-catalyzed propylene homopolymer (mPPH) commercially available from TOTAL Refining & Chemicals. Polypropylene Lumicene® MR 2002 is a metallocene-catalyzed propylene homopolymer (mPPH) commercially available from TOTAL Refining & Chemicals. To be coherent during comparison, additives used for the compositions were the same as the one used for the references, details of the additives are given in Table 7.

TABLE 7

| References | MR2001 | MR2002 | mPPR-3 |
|---|---|---|---|
| Additives (conc.) | Calcium Stearate (300 ppm by weight) Irgafos 168 (700 ppm by weight) Irganox 3114 (170 ppm by weight) | Calcium Stearate (300 ppm by weight) Irgafos 168 (700 ppm by weight) Irganox 3114 (170 ppm by weight) | Irgafos 168 (400 ppm by weight) Irganox 1010 (400 ppm by weight) |

The compositions were prepared by extrusion in a ZSK18 co-rotating twin screw kneader, manufactured by Coperion, having a screw diameter of 18 mm and a ratio of the length to the diameter of the screw (L/D) of 48. The throughput was of 2.5 kg/min and the screw speed at 260 rpm. The temperature profile in the extruder, i.e., the barrel temperatures, was:

180-185-190-190-190-190-190-185-185-190-195° C.

Features of final blends and references are shown in Tables 8 and 9.

TABLE 8

| Compositions | Compa 1 | Compa 2 | Blend 1 | Blend 2 | Blend 3 | Blend 4 | Blend 5 | Blend 6 | Blend 7 |
|---|---|---|---|---|---|---|---|---|---|
| HMW ref. | mPPH-4 | mPPH-4 | mPPR-2 | mPPR-1 | mPPR-1 | mPPR-1 | mPPR-2 | mPPR-2 | mPPR-3 |
| HMW % wt. | 41 | 47 | 45 | 50 | 51 | 55 | 40 | 44 | 62 |
| LMH ref. | mPPH-3 | mPPH-3 | mPPH-3 | mPPH-1 | mPPH-1 | mPPH-2 | mPPH-1 | mPPH-2 | mPPH-1 |
| LMW % wt. | 59 | 53 | 55 | 50 | 49 | 45 | 60 | 56 | 38 |
| Additives same as | MR2001 | MR2002 | | | | mPPR-3 | | | |
| MF$_2$ measured g/10 min | 29.4 | 16.2 | 22.4 | 11.6 | 10 | 8.6 | 10.6 | 10.5 | 26 |
| C$_2$ % wt. $^{13}$C NMR | 0 | 0 | 2.2 | 1.8 | 1.8 | 1.9 | 1.9 | 2.1 | 1.2 |
| Split in C$_2$ (% wt.) | 0 | 0 | 4.8 | 3.7 | 3.7 | 3.7 | 4.8 | 4.8 | 2 |
| Randomness (%) | | | 76 | | | | | 73 | |

TABLE 9

| References | MR2001 | MR2002 | mPPR-3 |
|---|---|---|---|
| MFI measured | 25.3 | 13.6 | 11.0 |
| C$_2$ % wt. $^{13}$C NMR | 0 | 0 | 2 |

Gel Permeation Chromatography as described in the test methods was used to measure $M_w$, $M_n$, $M_z$, $M_w/M_n$, $M_z/M_w$, $M_z/M_n$ the results are shown in Tables 10 and 11.

TABLE 10

| Compositions | Compa 1 | Compa 2 | Blend 1 | Blend 2 | Blend 3 | Blend 4 | Blend 5 | Blend 6 | Blend 7 |
|---|---|---|---|---|---|---|---|---|---|
| $M_n$ (kg/mol) | 26.9 | 29.5 | 28.5 | 46.2 | 38.1 | 33.0 | 43.8 | 34.8 | 47.0 |
| $M_w$ (kg/mol) | 220.3 | 245.5 | 264.2 | 211.0 | 233.8 | 245.6 | 246.4 | 255.2 | 164.1 |
| $M_z$ (kg/mol) | 803.3 | 824.4 | 976.1 | 573.7 | 697.4 | 738.6 | 812.9 | 881.6 | 358.9 |

TABLE 10-continued

| Compositions | Compa 1 | Compa 2 | Blend 1 | Blend 2 | Blend 3 | Blend 4 | Blend 5 | Blend 6 | Blend 7 |
|---|---|---|---|---|---|---|---|---|---|
| $M_w/M_n$ | 8.2 | 8.3 | 9.3 | 4.6 | 6.1 | 7.5 | 5.6 | 7.3 | 3.5 |
| $M_z/M_w$ | 3.6 | 3.4 | 3.7 | 2.7 | 3 | 3 | 3.3 | 3.5 | 2.2 |
| $M_z/M_n$ | 29.9 | 28.0 | 34.3 | 12.4 | 18.3 | 22.4 | 18.6 | 25.4 | 7.6 |

TABLE 11

| | References | MR2001 | MR2002 | mPPR-3 |
|---|---|---|---|---|
| $M_n$ | (kg/mol) | 55.4 | 65.0 | 73.5 |
| $M_w$ | (kg/mol) | 161.8 | 186.7 | 205.6 |
| $M_z$ | (kg/mol) | 310.3 | 360.1 | 399.4 |
| $M_w/M_n$ | | 2.9 | 2.9 | 2.8 |
| $M_z/M_w$ | | 1.9 | 1.9 | 1.9 |

The co-monomer distribution was then determined by GPC as described in the test methods section. The presence of co-monomer was related to the ratio of the signal at 2959 cm$^{-1}$ on the signal at 2928 cm$^{-1}$. The distribution of the co-monomer was calculated for every molecular weight knowing the ratio of the two signals. The ratio R of the signal at 2959 cm$^{-1}$ on the signal at 2928 cm$^{-1}$ was measured at $M=M_n$ and at $M=M_z$. Then, for each resins, the ratio of $R(M_z)$ on $R(M_n)$ were compared (FIG. 1 illustrate the calculation scheme).

Figure 4:
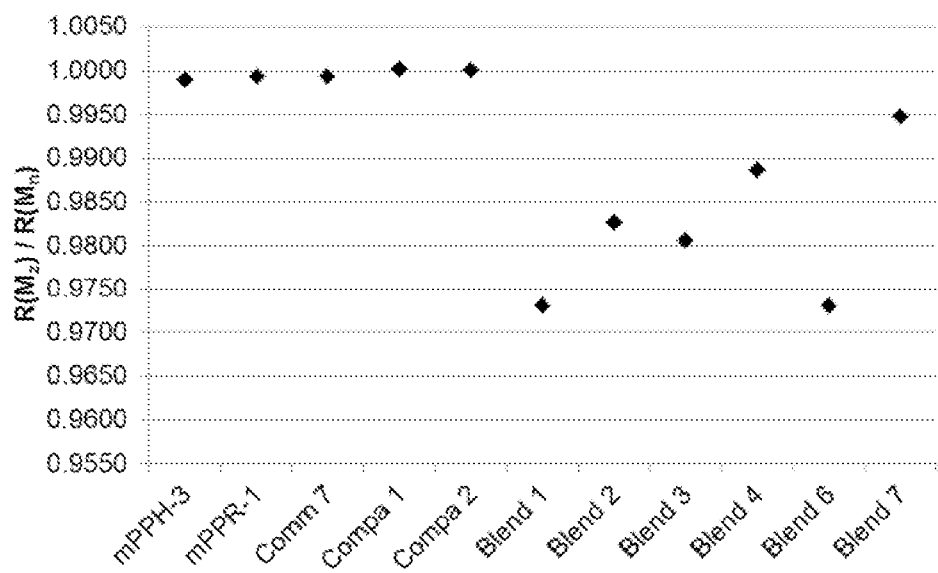
FIG. 4 represents a graph plotting co-monomer distribution ratio $R(M_z)/R(M_n)$ of several samples exemplified herein, as determined by IR-detected gel permeation chromatography.

The results are shown in Table 12. FIG. 4 shows co-monomer distribution ratio $R(M_z)/R(M_n)$ of several samples exemplified herein. The samples were analyzed several times to show the reproducibility of the experiment as shown in Tables 13 and 14.

TABLE 12

| Composition | GPC | Molecular weight (kg/mol) | Log(M) | Ratio 2959 cm$^{-1}$/2928 cm$^{-1}$ | | | |
|---|---|---|---|---|---|---|---|
| mPPH-3 | $M_n$ | 18.8 | 4.274 | $R(M_n)$ | 0.966 | $R(M_z)/R(M_n)$ | 0.999 |
| | $M_w$ | 54.8 | 4.739 | $R(M_w)$ | 0.966 | $R(M_w)/R(M_n)$ | 1.000 |
| | $M_z$ | 100.8 | 5.003 | $R(M_z)$ | 0.965 | $R(M_n)/R(M_z)$ | 1.001 |
| mPPR-2 | $M_n$ | 158.5 | 5.200 | $R(M_n)$ | 0.953 | $R(M_z)/R(M_n)$ | 0.999 |
| | $M_w$ | 446.2 | 5.650 | $R(M_w)$ | 0.953 | $R(M_w)/R(M_n)$ | 1.000 |
| | $M_z$ | 899.6 | 5.954 | $R(M_z)$ | 0.952 | $R(M_n)/R(M_z)$ | 1.001 |
| Compa 1 | $M_n$ | 26.9 | 4.430 | $R(M_n)$ | 0.912 | $R(M_z)/R(M_n)$ | 1.000 |
| | $M_w$ | 197.1 | 5.295 | $R(M_w)$ | 0.912 | $R(M_w)/R(M_n)$ | 1.000 |
| | $M_z$ | 681.8 | 5.834 | $R(M_z)$ | 0.912 | $R(M_n)/R(M_z)$ | 1.000 |
| Compa 2 | $M_n$ | 29.7 | 4.473 | $R(M_n)$ | 0.912 | $R(M_z)/R(M_n)$ | 1.000 |
| | $M_w$ | 220.4 | 5.343 | $R(M_w)$ | 0.911 | $R(M_w)/R(M_n)$ | 0.999 |
| | $M_z$ | 709.3 | 5.851 | $R(M_z)$ | 0.912 | $R(M_n)/R(M_z)$ | 1.000 |
| Blend 1 | $M_n$ | 27.2 | 4.435 | $R(M_n)$ | 0.911 | $R(M_z)/R(M_n)$ | 0.973 |
| | $M_w$ | 230.1 | 5.362 | $R(M_w)$ | 0.889 | $R(M_w)/R(M_n)$ | 1.003 |
| | $M_z$ | 863.9 | 5.936 | $R(M_z)$ | 0.886 | $R(M_n)/R(M_z)$ | 1.028 |
| Blend 2 | $M_n$ | 47.1 | 4.673 | $R(M_n)$ | 0.908 | $R(M_z)/R(M_n)$ | 0.983 |
| | $M_w$ | 219.7 | 5.342 | $R(M_w)$ | 0.896 | $R(M_w)/R(M_n)$ | 1.004 |
| | $M_z$ | 601.4 | 5.779 | $R(M_z)$ | 0.892 | $R(M_n)/R(M_z)$ | 1.018 |
| Blend 3 | $M_n$ | 38.3 | 4.584 | $R(M_n)$ | 0.910 | $R(M_z)/R(M_n)$ | 0.981 |
| | $M_w$ | 237.1 | 5.375 | $R(M_w)$ | 0.893 | $R(M_w)/R(M_n)$ | 1.002 |
| | $M_z$ | 697.2 | 5.843 | $R(M_z)$ | 0.892 | $R(M_n)/R(M_z)$ | 1.020 |
| Blend 4 | $M_n$ | 34.3 | 4.535 | $R(M_n)$ | 0.963 | $R(M_z)/R(M_n)$ | 0.989 |
| | $M_w$ | 248.4 | 5.395 | $R(M_w)$ | 0.951 | $R(M_w)/R(M_n)$ | 0.988 |
| | $M_z$ | 740.3 | 5.869 | $R(M_z)$ | 0.952 | $R(M_n)/R(M_z)$ | 1.011 |
| Blend 6 | $M_n$ | 35.0 | 4.544 | $R(M_n)$ | 0.910 | $R(M_z)/R(M_n)$ | 0.973 |
| | $M_w$ | 249.3 | 5.397 | $R(M_w)$ | 0.889 | $R(M_w)/R(M_n)$ | 1.004 |
| | $M_z$ | 836.2 | 5.922 | $R(M_z)$ | 0.885 | $R(M_n)/R(M_z)$ | 1.028 |
| mPPR-3 | $M_n$ | 75.4 | 4.878 | $R(M_n)$ | 0.958 | $R(M_z)/R(M_n)$ | 0.999 |
| | $M_w$ | 208.9 | 5.320 | $R(M_w)$ | 0.959 | $R(M_w)/R(M_n)$ | 1.001 |
| | $M_z$ | 403.4 | 5.606 | $R(M_z)$ | 0.958 | $R(M_n)/R(M_z)$ | 1.001 |
| Blend 7 | $M_n$ | 47.0 | 4.672 | $R(M_n)$ | 0.964 | $R(M_z)/R(M_n)$ | 0.995 |
| | $M_w$ | 164.1 | 5.215 | $R(M_w)$ | 0.960 | $R(M_w)/R(M_n)$ | 0.996 |
| | $M_z$ | 358.9 | 5.555 | $R(M_z)$ | 0.959 | $R(M_n)/R(M_z)$ | 1.005 |

TABLE 13

| Composition | GPC | Molecular weight (kg/mol) | Log(M) | Ratio 2959 cm$^{-1}$/2928 cm$^{-1}$ | | | |
|---|---|---|---|---|---|---|---|
| mPPH-3 | $M_n$ | 18.0 | 4.256 | 0.910 | | $R(M_z)/R(M_n)$ | 0.997 |
| | $M_w$ | 57.5 | 4.760 | 0.908 | | $R(M_w)/R(M_n)$ | 0.997 |
| | $M_z$ | 107.1 | 5.030 | 0.907 | | $R(M_n)/R(M_z)$ | 1.003 |
| mPPR-2 | $M_n$ | 118.5 | 5.074 | 0.889 | | $R(M_z)/R(M_n)$ | 0.998 |
| | $M_w$ | 410.4 | 5.613 | 0.887 | | $R(M_w)/R(M_n)$ | 0.998 |
| | $M_z$ | 854.7 | 5.932 | 0.887 | | $R(M_n)/R(M_z)$ | 1.002 |

TABLE 13-continued

| Composition | GPC | Molecular weight (kg/mol) | Log(M) | Ratio 2959 cm$^{-1}$/2928 cm$^{-1}$ | | |
|---|---|---|---|---|---|---|
| Blend 4 | $M_n$ | 30.8 | 4.488 | 0.907 | $R(M_z)/R(M_n)$ | 0.980 |
| | $M_w$ | 241.3 | 5.383 | 0.890 | $R(M_w)/R(M_n)$ | 0.982 |
| | $M_z$ | 730.2 | 5.863 | 0.889 | $R(M_n)/R(M_z)$ | 1.021 |
| mPPR-3 | $M_n$ | 63.3 | 4.801 | 0.897 | $R(M_z)/R(M_n)$ | 0.999 |
| | $M_w$ | 209.3 | 5.321 | 0.896 | $R(M_w)/R(M_n)$ | 0.998 |
| | $M_z$ | 412.8 | 5.616 | 0.896 | $R(M_n)/R(M_z)$ | 1.001 |

TABLE 14

| Composition | GPC | Molecular weight (kg/mol) | Log(M) | Ratio 2959 cm$_{-1}$/2928 cm$^{-1}$ | | |
|---|---|---|---|---|---|---|
| mPPH-3 | $M_n$ | 17.0 | 4.230 | 0.905 | $R(M_z)/R(M_n)$ | 0.998 |
| | $M_w$ | 53.4 | 4.728 | 0.903 | $R(M_w)/R(M_n)$ | 0.998 |
| | $M_z$ | 99.3 | 4.997 | 0.903 | $R(M_n)/R(M_z)$ | 1.002 |
| mPPR-2 | $M_n$ | 138.4 | 5.141 | 0.884 | $R(M_z)/R(M_n)$ | 1.000 |
| | $M_w$ | 415.1 | 5.618 | 0.882 | $R(M_w)/R(M_n)$ | 0.999 |
| | $M_z$ | 836.7 | 5.923 | 0.883 | $R(M_n)/R(M_z)$ | 1.000 |
| Blend 4 | $M_n$ | 31.4 | 4.498 | 0.903 | $R(M_z)/R(M_n)$ | 0.980 |
| | $M_w$ | 240.0 | 5.380 | 0.886 | $R(M_w)/R(M_n)$ | 0.981 |
| | $M_z$ | 710.8 | 5.852 | 0.885 | $R(M_n)/R(M_z)$ | 1.020 |
| mPPR-3 | $M_n$ | 67.5 | 4.829 | 0.893 | $R(M_z)/R(M_n)$ | 0.999 |
| | $M_w$ | 204.0 | 5.310 | 0.891 | $R(M_w)/R(M_n)$ | 0.999 |
| | $M_z$ | 394.6 | 5.596 | 0.892 | $R(M_n)/R(M_z)$ | 1.001 |

Mechanical properties were analyzed and the results are shown in Tables 15 and 16.

TABLE 15

| Compositions | Compa 1 | Compa 2 | Blend 1 | Blend 2 | Blend 3 | Blend 4 | Blend 5 | Blend 6 |
|---|---|---|---|---|---|---|---|---|
| Flex. Mod. (MPa) | 1550 | 1540 | 1150 | 1060 | 1110 | 1110 | 1070 | 1060 |
| Izod (kJ/m$^2$) | 2.4 | 2.5 | 3.1 | 3.5 | 3.4 | 3.4 | 3.5 | 3.4 |
| Stiffness/Izod | 640 | 626 | 376 | 306 | 327 | 328 | 303 | 311 |
| Haze (%) | | | | | | 43.4 | 45.2 | |
| Gloss (60°) | | | | | | 97.3 | 98.9 | |
| Spiral flow conditions | Profile 1 | Profile 1 | Profile 1 | Profile 1 | Profile 1 | Profile 2 | Profile 2 | Profile 1 |
| Spiral Flow 240° C. -500 bars (mm) | 569 | 495 | 523 | 366 | | 422 | 376 | 416 |
| Charply 23° C. (KJ/m$^2$) 0° C. | | | | 3.4 / 1.2 | | | | 3.4 / 1.2 |

TABLE 16

| References | MR2001 | MR2002 | mPPR-3 | mPPR-3 |
|---|---|---|---|---|
| Flex. Mod. (MPa) | 1370 | 1370 | 1005 | |
| Izod (kJ/m$^2$) | 2.6 | 2.8 | 3.5 | |
| Stiffness/Izod | 535 | 484 | 284 | |
| Haze (%) | | | 51.4 | |
| Gloss (60°) | | | 98.2 | |
| Spiral flow conditions | Profile 1 | Profile 1 | Profile 1 | Profile 2 |
| Spiral Flow (240° C. -500 bars) (mm) | 387 | 329 | 277 | 293 |

An increase in stiffness (+/−15%) can be noticed for similar impact properties when compositions according to the invention are compared to references. Stiffness/impact balance has been improved.

Moreover, by comparison with references, spiral flow measured was +/−50% longer. Improvement of injection ability was also observed.

The assessment of thermal properties was performed by Differential Scanning Calorimetry (DSC), results are detailed in Table 17.

TABLE 17

| Compositions | Compa 1 | Compa 2 | Blend 1 | Blend 2 | Blend 3 | Blend 4 | Blend 5 | Blend 6 | Blend 8 | MR2001 | MR2002 | mPPR-3 |
|---|---|---|---|---|---|---|---|---|---|---|---|---|
| $T_m$ (peak) °C. | 150 | 151 | 148 | 144 | 144 | 144 | 146 | 145 | 144 | 150 | 150 | 134 |
| $T_c$ (peak) °C. | 111 | 111 | 110 | 107 | 107 | 106 | 107 | 107 | 107 | 110 | 107 | 94 |
| $T_m$-$T_c$ °C. | 39 | 40 | 38 | 37 | 37 | 38 | 39 | 38 | 37 | 40 | 43 | 40 |

For the examples according to the invention, it can be seen that the bimodality in $C_2$-content has a strong effect on melting and crystallization temperatures. Indeed, with a split of 3.7% (respectively 4.8%) in $C_2$ content between low molecular weight and high molecular weight, the crystallization temperature increases with about 12° C. (resp. 14° C.). Thus, cycle time during injection was decreased.

A nucleating agent (1850 ppm by weight of bis(3,4-dimethyl-dibenzylidene) sorbitol (DMDBS)) was added to composition 4 and 5. The assessment of thermal properties of the composition was performed by DSC, results are shown in Table 18.

TABLE 18

| Compositions | 4 | 4+ nucleating agent | 5 | 5+ nucleating agent |
|---|---|---|---|---|
| Melting temperature $T_m$ (peak) (° C.) | 144 | 150 | 146 | 152 |
| Melting enthalpy (J/g) | 90.4 | 71.6 | 86.4 | 74.8 |
| Melting onset temperature (° C.) | 139 | 143 | 140 | 145 |
| Crystallization temperature $T_c$ (peak) (° C.) | 106 | 123 | 107 | 123 |
| Crystallization enthalpy (J/g) | −74.1 | −69.4 | −72.6 | −72.4 |
| $T_m$-$T_c$ (° C.) | 38 | 27 | 39 | 29 |

The invention claimed is:

1. A polypropylene composition comprising:
(A) a first polypropylene which is a metallocene-catalyzed homopolymer; and
(B) a second polypropylene which is a metallocene-catalyzed random copolymer of propylene and of a co-monomer;
wherein the polypropylene composition has:
a total co-monomer content of at least 1.1% by weight relative to the total weight of the polypropylene composition, as determined by $^{13}C$ NMR analysis, the co-monomer being an alpha-olefin different from propylene;
a melting temperature $T_m$ of at least 140° C., measured by DSC;
a crystallization temperature $T_c$ of at least 95° C., measured by DSC;
a ratio of weight average molecular weight ($M_w$) to number average molecular weight ($M_n$) [$M_w/M_n$] of at least 3.5;
a ratio of z-average molecular weight ($M_z$) to weight average molecular weight ($M_w$) [$M_z/M_w$] of at least 2.2; and
a co-monomer distribution ratio $R(M_z)/R(M_n)$ of at most 0.995, wherein $R(M_z)$ is the ratio at $M_z$ of the IR signal measured at 2959 cm$^{-1}$ on the signal at 2928 cm$^{-1}$, and $R(M_n)$ is the ratio at $M_n$ of the IR signal measured at 2959 cm$^{-1}$ on the signal at 2928 cm$^{-1}$, as determined by IR-detected gel permeation chromatography.

2. The polypropylene composition according to claim 1, wherein the difference between the melting temperature $T_m$ and the crystallization temperature $T_c$ of the polypropylene composition ($T_m$-$T_c$) is greater than 33° C.

3. The polypropylene composition according to claim 1, having a ratio of z-average molecular weight ($M_z$) to number average molecular weight ($M_n$) [$M_z/M_n$] of at least 6.0.

4. The polypropylene composition according to claim 1, wherein the melt flow index of the first polypropylene is greater than the melt flow index of the second polypropylene; the values of melt flow index being measured according to ISO 1133:2005 Method B, condition M, at a temperature 230° C. and a 2.16 kg load.

5. The polypropylene composition according to claim 1, wherein the co-monomer is ethylene.

6. The polypropylene composition according to claim 1, wherein the melt flow index of the first polypropylene is greater than 30.0 g/10 min; as measured according to ISO 1133:2005 Method B, condition M, at a temperature 230° C. and a 2.16 kg load.

7. The polypropylene composition according to claim 1, wherein the melt flow index of the second polypropylene is of at most 30.0 g/10 min; as measured according to ISO 1133:2005 Method B, condition M, at a temperature 230° C. and a 2.16 kg load.

8. The polypropylene composition according to claim 1, having a melt flow index ranging from 1.0 to 200 g/10 min; as measured according to ISO 1133:2005 Method B, condition M, at a temperature 230° C. and a 2.16 kg load.

9. The polypropylene composition according to claim 1, having a flexural modulus greater than 1000 MPa, the flexural modulus being measured at 23° C. according to ISO 178:2011 method A.

10. The polypropylene composition according to claim 1, wherein the polypropylene composition comprises a physical blend of the first polypropylene and second polypropylene.

11. A process for the preparation of the polypropylene composition comprising:
(i) providing a first polypropylene which is a metallocene-catalyzed homopolymer
(ii) providing a second polypropylene which is a metallocene-catalyzed random copolymer of propylene and of a co-monomer,
(iii) and obtaining a polypropylene composition comprising the first and second polypropylene, wherein steps (i) and (ii) are carried out by polymerizing propylene and, if any, the co-monomer in the presence of a metallocene catalyst; the polypropylene composition having:
a total co-monomer content of at least 1.1% by weight relative to the total weight of the polypropylene composition, as determined by $^{13}C$ NMR analysis, the co-monomer being an alpha-olefin different from propylene;
a melting temperature $T_m$ of at least 140° C., measured by DSC;
a crystallization temperature $T_c$ of at least 95° C., measured by DSC;
a ratio of weight average molecular weight ($M_w$) to number average molecular weight ($M_n$) [$M_w/M_n$] of at least 3.5;
a ratio of z-average molecular weight ($M_z$) to weight average molecular weight ($M_w$) [$M_z/M_w$] of at least 2.2; and
a co-monomer distribution ratio $R(M_z)/R(M_n)$ of at most 0.995, wherein $R(M_z)$ is the ratio at $M_z$ of the IR signal measured at 2959 cm$^{-1}$ on the signal at 2928 cm$^{-1}$, and $R(M_n)$ is the ratio at $M_n$ of the IR signal measured at 2959 cm$^{-1}$ on the signal at 2928 cm$^{-1}$, as determined by IR-detected gel permeation chromatography.

12. The process according to claim 11, wherein the polypropylene composition of step (iii) is obtained by physical blending of the first and second polypropylene.

13. The process according to claim 11, wherein the polypropylene composition of step (iii) is obtained by chemical blending of the first and second polypropylene.

14. An article comprising a polypropylene composition according to claim 1.

\* \* \* \* \*